United States Patent
Izuha et al.

(10) Patent No.: US 8,490,031 B2
(45) Date of Patent: Jul. 16, 2013

(54) METHOD, APPARATUS AND PROGRAM FOR ADJUSTING FEATURE DIMENSIONS TO COMPENSATE FOR PLANARIZING EFFECTS IN THE GENERATION OF MASK DATA AND MANUFACTURING SEMICONDUCTOR DEVICE

(75) Inventors: Kyoko Izuha, Kanagawa (JP); Shunichi Shibuki, Kanagawa (JP); Takashi Sakairi, Kumamoto (JP)

(73) Assignee: Sony Corporation, Tokyo (JP)

( * ) Notice: Subject to any disclaimer, the term of this patent is extended or adjusted under 35 U.S.C. 154(b) by 171 days.

(21) Appl. No.: 12/771,645

(22) Filed: Apr. 30, 2010

(65) Prior Publication Data

US 2010/0299643 A1 Nov. 25, 2010

(30) Foreign Application Priority Data

May 20, 2009 (JP) ................................ 2009-121604

(51) Int. Cl.
*G06F 17/50* (2006.01)
(52) U.S. Cl.
USPC ............... 716/54; 716/50; 716/51; 716/52; 716/53; 716/55; 716/139
(58) Field of Classification Search
USPC ........................... 716/50–55, 139
See application file for complete search history.

(56) References Cited

U.S. PATENT DOCUMENTS

| 6,893,800 B2 * | 5/2005 | Jessen et al. ................... 430/311 |
| 7,174,520 B2 * | 2/2007 | White et al. ................... 716/136 |
| 7,186,488 B2 * | 3/2007 | Nagai ............................. 430/30 |
| 7,601,471 B2 * | 10/2009 | Osawa et al. ................... 430/30 |
| 2007/0300194 A1 | 12/2007 | Fukuda |

FOREIGN PATENT DOCUMENTS

| JP | 10-044028 | 2/1998 |
| JP | 10-144635 | 5/1998 |
| JP | 10-293391 | 11/1998 |
| JP | 2007-103634 | 4/2007 |
| JP | 2008-004683 | 1/2008 |

* cited by examiner

*Primary Examiner* — Nghia Doan
(74) *Attorney, Agent, or Firm* — Dentons US LLP

(57) ABSTRACT

A method for manufacturing a semiconductor device includes the steps of reading physical layout data of a circuit to be manufactured and performing calculation to modify a pattern width in the physical layout data by a predetermined amount; reading a physical layout and analyzing a pattern that is predicted to remain as a step difference of a predetermined amount or more in a case where a planarization process is performed on a planarizing film on a pattern by a quantitative calculation by using at least one of a density of patterns, a pattern width, and a peripheral length of a range of interest and a range in the vicinity of the range of interest; and reading data of the pattern that is predicted to remain as a step difference, and making a correction to a layout in which a step difference of a predetermined amount or more does not remain.

12 Claims, 17 Drawing Sheets

FIG. 3

| Polishing Process | Step-Difference Occurrence Factor | Algorithm (1) HIGH COVERAGE RATIO × LARGE AREA | Algorithm (2) LOW COVERAGE RATIO × LARGE AREA | Algorithm (3) WIDE WIDTH WIRING × LARGE AREA | Algorithm (4) LOW COVERAGE RATIO + LARGE COVERAGE RATIO DIFFERENCE WITH ADJACENT AREA | Algorithm (5) LOW COVERAGE RATIO + LARGE COVERAGE RATIO DIFFERENCE WITH ADJACENT AREA | Algorithm (6) NARROW WIDTH WIRING × LARGE AREA + ADJACENT AREA HAS LOW COVERAGE RATIO |
|---|---|---|---|---|---|---|---|
| STI-CMP | OXIDE FILM REMAINING |  | ○ (STI) |  |  |  |  |
|  | EROSION | ○ (STI) |  |  |  |  |  |
|  | DISHING |  | ○ | ○ (STI) |  |  |  |
| PMD-CMP | INSUFFICIENT PLANARIZATION (PMD=NSG) | ○ | ○ |  |  |  |  |
|  | INSUFFICIENT PLANARIZATION (PMD=HDP) | ○ | ○ |  |  |  |  |
| W-CMP | EROSION-1 | ○ |  |  |  |  |  |
|  | EROSION-2 |  |  |  | ○ |  |  |
|  | DISHING |  |  | ○ |  |  |  |
| Cu-CMP | Fang |  |  |  |  | ○ |  |
|  | Hump-1 |  |  |  |  |  | ○ |

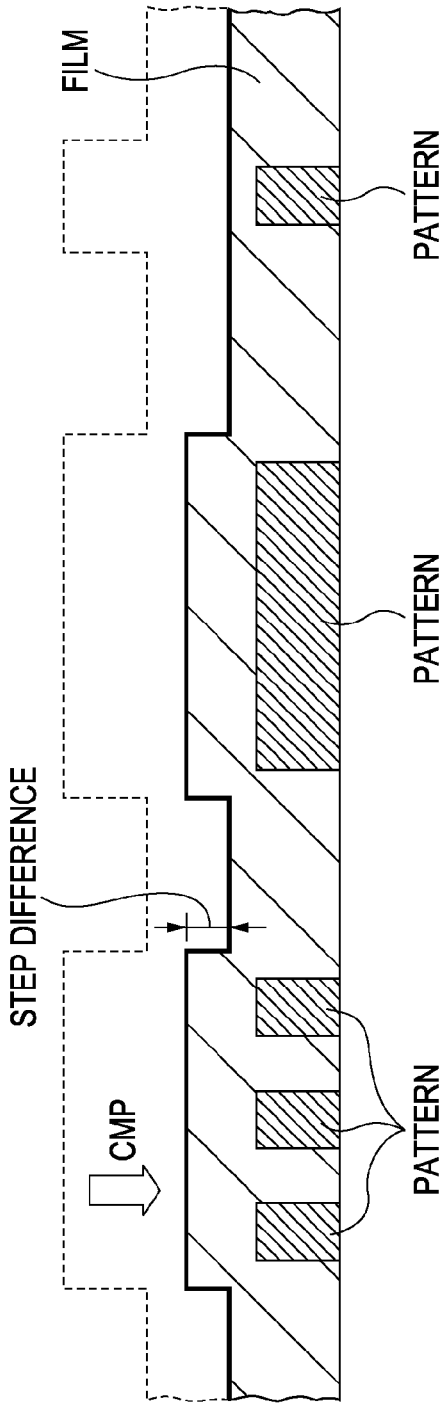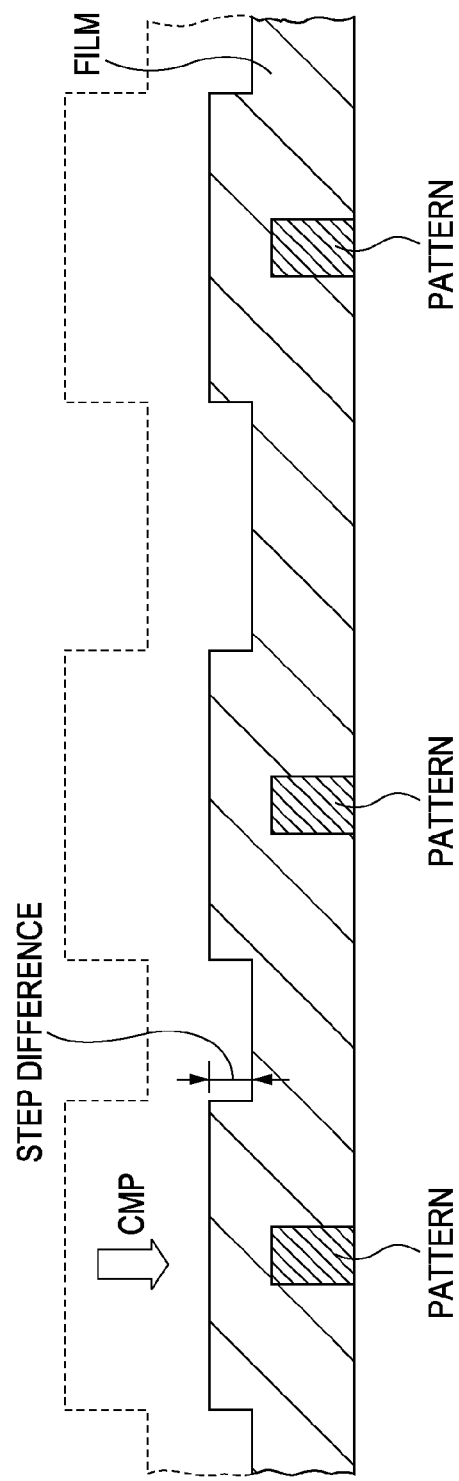

$\alpha > 80\% \rightarrow$ NO (NOT CRITICAL STEP-DIFFERENCE PORTION)
  ↓ YES
$\sum\sum_{ij} \alpha ij/49 > 75\% \rightarrow$ NO (NOT CRITICAL STEP-DIFFERENCE PORTION)
i=−3 TO 3
j=−3 TO 3
  ↓ YES
  CRITICAL STEP-DIFFERENCE PORTION (LEVEL A)

$\sum\sum \alpha ij/441 > 75\% \rightarrow$ NO (NOT CRITICAL STEP-DIFFERENCE PORTION)
i=−10 TO 10
j=−10 TO 10
  ↓ YES
  CRITICAL STEP-DIFFERENCE PORTION (LEVEL B)

$\alpha < 20\% \rightarrow$ NO (NOT CRITICAL STEP-DIFFERENCE PORTION)
          ↓ YES
$\sum_i \sum_j \alpha ij / 49 < 30\% \rightarrow$ NO (NOT CRITICAL STEP-DIFFERENCE PORTION)
i=−3 TO 3
j=−3 TO 3
          ↓ YES
          CRITICAL STEP-DIFFERENCE PORTION (LEVEL A)
$\sum\sum \alpha ij / 441 < 35\% \rightarrow$ NO (NOT CRITICAL STEP-DIFFERENCE PORTION)
i=−10 TO 10
j=−10 TO 10
          ↓ YES
          CRITICAL STEP-DIFFERENCE PORTION (LEVEL B)

$\alpha < 20\% \rightarrow$ NO (NOT CRITICAL STEP-DIFFERENCE PORTION)
↓ YES $\sum_i \sum_j \alpha ij / 49 < 30\% \rightarrow$ NO (NOT CRITICAL STEP-DIFFERENCE PORTION)
i=−3 TO 3
j=−3 TO 3 ↓ YES
CRITICAL STEP-DIFFERENCE PORTION (LEVEL A)

$\sum \sum \alpha ij / 441 < 35\% \rightarrow$ NO (NOT CRITICAL STEP-DIFFERENCE PORTION)
i=−10 TO 10
j=−10 TO 10
↓ YES
CRITICAL STEP-DIFFERENCE PORTION (LEVEL B)

THREE OR MORE MESHES IN WHICH PATTERN OF LINE WIDTH OF L > CONSTANT EXISTS ARE ADJACENT

L < CONSTANT → NO (NOT CRITICAL STEP-DIFFERENCE PORTION)
↓ (YES)
$\Sigma L_{ij}$ &
i=−3 TO 3, j=−3 TO 3
↓
CRITICAL STEP-DIFFERENCE PORTION $\rho A \leq 5\%$
&
$\rho A_{ij} - \rho A \geq 10\%$ (i=−1 TO +1, j=−1 TO +1)

Fang
PATTERN

TARGET MESH $\rho A \leq 20\%$
&
$\rho A_{ij} - \rho A \geq 20\%$ (i=−1 TO +1, j=−1 TO +1)

$40\% \leq \rho_A \leq 60\%$ & $\Sigma\alpha_{ij}$ (I,j=0 TO 4)/5 ≤ 10%
(HORIZONTAL, VERTICAL, AND DIAGONAL DIRECTION)
&
Peri > CONSTANT (PERIPHERAL LENGTH IS SET VALUE OR MORE)
&
$L \leq 3*L_{min}$, $L_{min}$: MINIMUM WIDTH L OF DR CAN BE DETECTED IF THERE IS EVEN ONLY ONE LINE IN THE AREA

FIG. 15

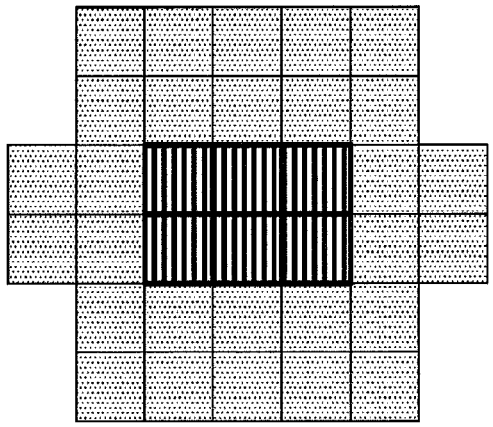

 ... MESH ELEMENTS IN WHICH LINE WIDTH SMALLER THAN 3 TIMES MINIMUM LINE WIDTH OF DESIGN RULE EXISTS, AND PERIPHERAL LENGTH OF THE MESH IS SET VALUE OR MORE

 ... PERIPHERAL MESH ELEMENTS IN WHICH COVERAGE RATIO IS SET VALUE OR LESS MESH ELEMENTS IN WHICH $L < 3*L_{min}$ AND Peri > CONSTANT, AND TWO SUCH MESH ELEMENTS ARE ADJACENT. FURTHERMORE, TWO OR MORE MESH ELEMENTS HAVING COVERAGE RATIO OF 20% OR LESS ARE ADJACENT.

$L < 3*L_{min}$ AND Peri > CONSTANT → NO (NOT CRITICAL STEP-DIFFERENCE PORTION)

↓ (YES)

$\Sigma L_{ij}$ &
$i = -3$ TO $3, j = -3$ TO $3$
$\alpha a \leq 20\%$
$\Sigma \alpha_{ij}$ &
$i = -2$ TO $2, j = -2$ TO $2$   ↓
CRITICAL STEP-DIFFERENCE PORTION

FIG. 17

| ρAij−ρA [%] / ρA [%] | 0 | 5 | 10 | 11 | 12 | 13 | 14 | 15 | 15> |
|---|---|---|---|---|---|---|---|---|---|
| 0 | ○ | ○ |   |   |   |   |   |   |   |
| 1 | ○ | ○ | ○ |   |   |   |   |   |   |
| 2 | ○ | ○ | ○ | ○ |   |   |   |   |   |
| 3 | ○ | ○ | ○ | ○ | ○ |   |   |   |   |
| 4 | ○ | ○ | ○ | ○ | ○ | ○ |   |   |   |
| 5 | ○ | ○ | ○ | ○ | ○ | ○ | ○ |   |   |

US 8,490,031 B2

METHOD, APPARATUS AND PROGRAM FOR ADJUSTING FEATURE DIMENSIONS TO COMPENSATE FOR PLANARIZING EFFECTS IN THE GENERATION OF MASK DATA AND MANUFACTURING SEMICONDUCTOR DEVICE

BACKGROUND OF THE INVENTION

1. Field of the Invention

The present invention relates to a method for manufacturing a semiconductor device, an apparatus for manufacturing a semiconductor device, a program for manufacturing a semiconductor device, and a program for generating mask data. More particularly, the present invention relates to a method for manufacturing a semiconductor device, an apparatus for manufacturing a semiconductor device, a program for manufacturing a semiconductor device, and a program for generating mask data that predict a portion that will remain as a step difference in a case where a planarizing film on a pattern is to be planarized and reflect the existence of the portion in the correction of a layout and in manufacturing conditions.

2. Description of the Related Art

As one of technologies for dealing with higher integration of semiconductor integrated circuits, a planarization process has been performed when semiconductor integrated circuits are to be manufactured. One example of the planarization processing technologies is a chemical mechanical polishing method (hereinafter sometimes referred to as a "CMP method").

FIG. 18 is a conceptual view of a polishing device for use in a CMP method. This polishing device includes a polishing plate, a substrate holding base, and an abrasive slurry supply system. The polishing plate is movably supported by the rotational axle of the polishing plate, which rotates, and the surface thereof is provided with a polishing pad.

The substrate holding base is arranged above the polishing plate and is movably supported by the rotational axle of the substrate holding base. For example, in a case where a substrate is to be polished, the substrate is placed on the substrate holding base. The rotational axle of the substrate holding base is mounted in a polishing pressure adjustment mechanism (not shown) that presses the substrate holding base in the direction of the polishing pad.

Then, the polishing plate is rotated while an abrasive slurry containing an abrasive agent is supplied from the abrasive slurry supply system to the polishing pad. At the same time, while the substrate placed on the substrate holding base is being rotated, the polishing pressure of the substrate with respect to the polishing pad is adjusted by the polishing pressure adjustment mechanism. In the manner described above, it is possible to polish the surface of the substrate.

Here, when, after a thin film has been formed on a circuit pattern, the formed thin film is to be planarized by a CMP method, prediction in advance of the thickness of the thin film after planarization is very important for the purpose of solving problems at an early stage and reducing the manufacturing cost in the manufacture of semiconductor devices. Furthermore, in analysis of characteristics of the semiconductor device, that is, from the viewpoint of ensuring timing convergence in an integrated circuit, in particular, RC extraction (parasitic resistance, parasitic capacitance extraction), information on the cross-sectional structure of the semiconductor device is used. Therefore, by predicting in advance the value of the film thickness of a thin film that is to be formed on a circuit pattern and planarized, it is possible to shorten the time taken to achieve timing convergence and to feed back and use the information in the layout of components, such as a dummy fill.

To date, as techniques for predicting film formation and polishing processes, simulation technologies have been proposed (see, for example, Japanese Patent No. 3580036, Japanese Patent No. 3743120, Japanese Unexamined Patent Application Publication No. 2007-103634, Japanese Unexamined Patent Application Publication No. 2008-4683, and Japanese Unexamined Patent Application Publication No. 10-144635).

In Japanese Patent No. 3580036, a simulation method is disclosed for predicting the shape of a step difference that will remain after polishing is performed for a predetermined time period. That is, in a case where CMP is performed using a polishing cloth, a pressure distribution due to stress modification that is given to the polishing cloth by a step-difference shape is calculated by the finite element method, and this distribution is converted into a polishing rate so as to predict a processed shape after a unit time period.

In Japanese Patent No. 3743120, a technique is disclosed for predicting the amount of film that will remain after polishing on the basis of an area ratio. Japanese Unexamined Patent Application Publication No. 2007-103634 is directed to a technology for considering the film formation state before polishing at the time of calculations after polishing by changing the area ratio; in particular, a technology that considers the amount of conversion of the pattern width of the film formation by O-TEOS and HDP has been proposed. Furthermore, a polishing pressure is calculated on the basis of the area ratio of the pattern after conversion, and is converted into a polishing rate so as to calculate the amount of polishing.

In Japanese Unexamined Patent Application Publication No. 2008-4683, a technique is disclosed in which the film thickness after plating is calculated by using a model created by a calibration method so as to obtain the film thickness after polishing.

Additionally, in Japanese Unexamined Patent Application Publication No. 10-144635, a technology is disclosed in which the relationship between step-difference densities and film-thickness step differences is determined in advance in a test element group (TEG), the area density in the actual layout is calculated, and a dummy portion is generated in portions in which a predetermined step-difference threshold value is exceeded.

SUMMARY OF THE INVENTION

However, in the above-described simulation technologies, problems arise in that the processing time period is long because calculation of the film thickness after plating and calculation of the amount of polishing of the entire surface of a chip are performed, and it takes a longer time to obtain experimental data with a technique based on TEG data.

That is, in the techniques that have been proposed to date, a film is formed and a polishing model is created before calculations are performed. In order to create this model, it is necessary to obtain TEG data in advance and input it to a film formation and polishing model so as to determine parameters. Consequently, when obtaining of experimental data, a calibration time, and the like are considered, many processes in addition to the time taken to calculate the film thickness after actual polishing are necessary.

Furthermore, if time is taken to calculate the film thickness after polishing, incorporating this calculation into the design environment is impractical. Thus, it is difficult to use the calculation for optimization of a dummy portion, as described in Japanese Unexamined Patent Application Publication No. 10-144635. For this reason, as in U.S. Patent No. 2004/0139419, in a case where coordination with the design environment, such as dummy optimization and layout correction, is to be realized, use of calculations of a film thickness based on a model is burdensome to processing.

In all the examples of the related art, a film thickness calculation is performed by using mask data that is output after a placement and routing process, and a determination is made of the step difference. For this reason, if an error of a step difference is found at this point, correction becomes necessary by returning to the start of the layout design, and a large influence is exerted on the design processing time period.

It is desirable to provide a technology for quickly and precisely predicting a portion in which a step difference of a predetermined amount or more will occur when a planarizing film on a pattern is to be planarized and for performing layout correction in a short time.

According to an embodiment of the present invention, there is provided a method for manufacturing a semiconductor device, including the steps of: reading physical layout data of a circuit to be manufactured into a calculation unit and performing a calculation to modify a pattern width in the physical layout data by a predetermined amount; reading a physical layout after the pattern width is modified, the physical layout being output from the calculation unit, into an analysis unit, and analyzing a pattern that is predicted to remain as a step difference of a predetermined amount or more in a case where a planarization process is performed on a planarizing film on a pattern by a quantitative calculation by using, with regard to a range of interest of the physical layout, at least one of a density of patterns, a pattern width, and a peripheral length of the range of interest and a range in the vicinity of the range of interest; and reading data of the pattern that is predicted to remain as a step difference, the data being output from the analysis unit, into a correction unit, and making a correction to a layout or manufacturing conditions in which a step difference of a predetermined amount or more does not remain.

According to another embodiment of the present invention, there is provided an apparatus for manufacturing a semiconductor device, including: a calculation unit configured to read physical layout data of a circuit to be manufactured and perform a calculation to modify a pattern width in the physical layout data by a predetermined amount; an analysis unit configured to read a physical layout after the pattern width is modified, the physical layout being output from the calculation unit, and analyze a pattern that is predicted to remain as a step difference of a predetermined amount or more in a case where a planarization process is performed on a planarizing film on a pattern by a quantitative calculation by using, with regard to a range of interest of the physical layout, at least one of a density of patterns, a pattern width, and a peripheral length of the range of interest and a range in the vicinity of the range of interest; and a correction unit configured to read data of a pattern that is predicted to remain as the step difference, the data being output from the analysis unit, and make a correction to a layout in which a step difference of a predetermined amount or more does not remain.

According to another embodiment of the present invention, there is provided a program for manufacturing a semiconductor device, the program causing a computer to perform processing including the steps of: performing a calculation to modify a pattern width in physical layout data of a circuit to be manufactured by a predetermined amount; analyzing a pattern that is predicted to remain as a step difference of a predetermined amount or more in a case where a planarization process is performed on a planarizing film on a pattern by a quantitative calculation by using, with regard to a range of interest of the physical layout after the pattern width is modified, at least one of a density of patterns, a pattern width, and a peripheral length of the range of interest and a range in the vicinity of the range of interest; and making a correction to a layout or manufacturing conditions in which the step difference of a predetermined amount or more does not remain on the basis of data of a pattern that is predicted to remain as the step difference.

According to another embodiment of the present invention, there is provided a program for generating mask data, the program causing a computer to perform processing including the steps of: performing a calculation to modify a pattern width in physical layout data of a circuit to be manufactured by a predetermined amount; analyzing a pattern that is predicted to remain as a step difference of a predetermined amount or more in a case where a planarization process is performed on a planarizing film on a pattern by a quantitative calculation by using, with regard to a range of interest of the physical layout after the pattern width is modified, at least one of a density of patterns, a pattern width, and a peripheral length of the range of interest and a range in the vicinity of the range of interest; and making a correction to a layout in which a step difference of a predetermined amount or more does not remain on the basis of data of the pattern that is predicted to remain as the step difference, and generating mask data on the basis of the corrected layout.

In such embodiments of the present invention, by modifying a pattern width in physical layout data by only a predetermined amount, the state before polishing of a planarizing film on the pattern is predicted. The state of the step difference after polishing is predicted using quantitative calculations on the basis of this predicted state of the planarizing film before polishing. Thus, it is possible to extract a portion in which a step difference has occurred in a short time.

More specifically, (1) the line width of a layout pattern is converted (resized) for each type of film to be formed so as to generate the state of the formed film before polishing. (2) Shape checking is performed for the layout after conversion of the line width, and a critical step-difference portion is extracted. It is assumed that the rules of resizing and the rules of shape checking are determined for each film type and step difference. According to embodiments of the present invention, it is possible to extract a critical step-difference portion in a processing time period equal to that for shape checking (for example, design rule checking). Therefore, the extracted result can be fed back to the optimization of a process and also, since a load is not incurred on processing, the extracted result can be loaded into the design environment and used for layout optimization.

According to embodiments of the present invention, it is possible to quickly and precisely predict a portion in which a step difference of over a predetermined size will occur when planarizing a planarizing film on a pattern and possible to perform layout correction in a short time. Furthermore, by creating manufacturing processing conditions for preventing step-difference collapse on the basis of the predicted results, it is possible to prevent step-difference collapse at manufacturing time.

BRIEF DESCRIPTION OF THE DRAWINGS

FIG. 3 shows an example of correspondence among polishing processes, step-difference occurrence factors, and algorithms to be used for extracting a critical step-difference pattern;

FIGS. 4A and 4B show the concept of an occurrence of a step difference of CS-CMP;

FIG. 15 is a second diagram illustrating an algorithm for extracting Hump;

FIG. 17 shows results in which a planarization process is performed by a CMP method.

DESCRIPTION OF THE PREFERRED EMBODIMENTS

Figure 1:
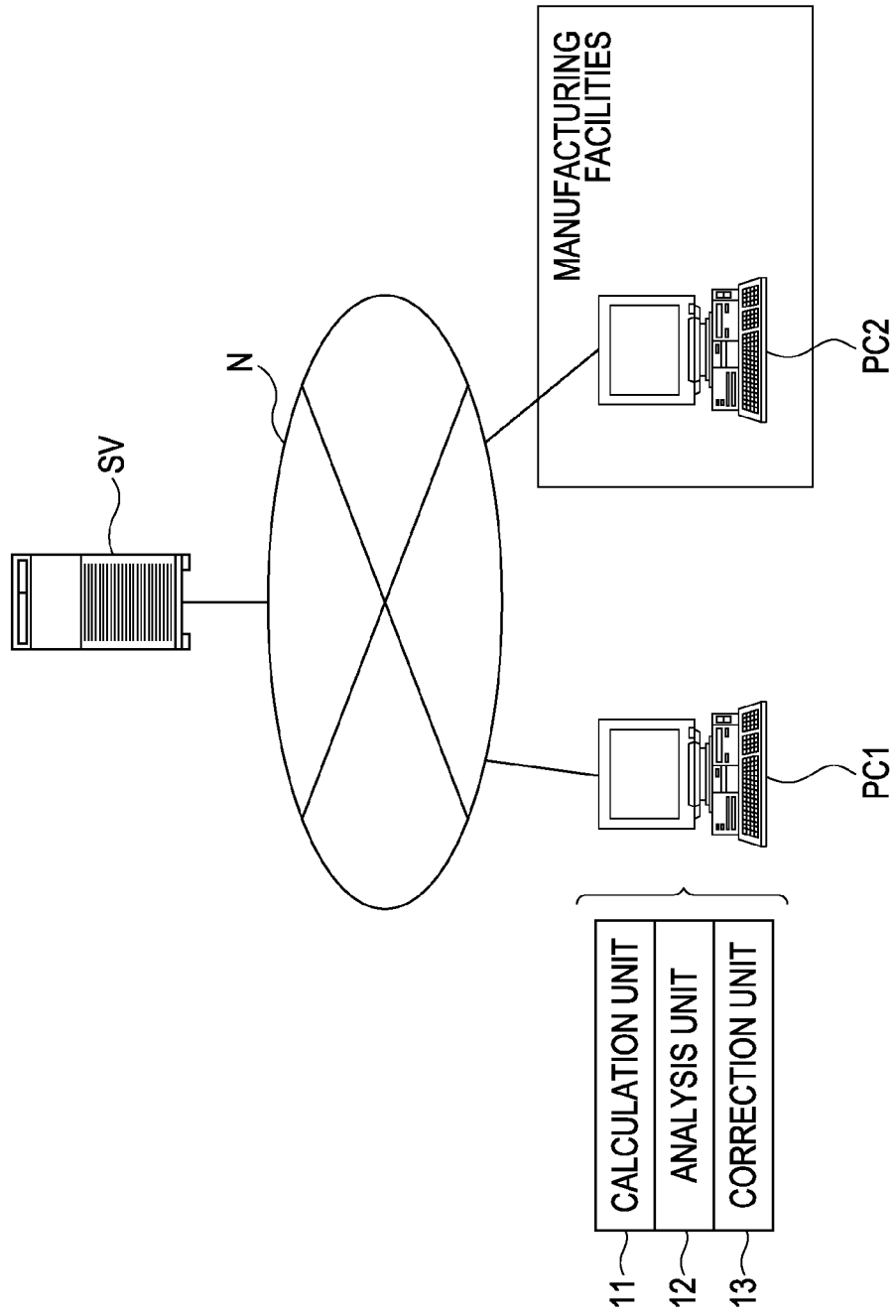
FIG. 1 illustrates an example of the configuration of a system to which an apparatus for manufacturing a semiconductor device according to the present embodiment is applied.

Modes (hereinafter referred to as "embodiments") for carrying out the present invention will be described below. The description will be given in the following order.
1. Configuration in which the present embodiment is applied (example of configuration of apparatus, example of application to program for generating mask data, and example of application to method for manufacturing semiconductor device)
2. Specific embodiments (first to ninth embodiments)
3. Form of program
1. Configuration in which the Present Embodiment is Applied
Apparatus Configuration FIG. 1 illustrates an example of the configuration of a system to which an apparatus for manufacturing a semiconductor device according to the present embodiment is applied. The apparatus for manufacturing a semiconductor device according to the present embodiment is mainly realized using a computer PC1. The computer PC1 is connected to a network N. The computer PC1 reads various data from a server SV connected to the network N, and generates physical layout data of a circuit of a semiconductor device to be manufactured. The generated physical layout data is sent to a computer PC2 attached to manufacturing facilities of the semiconductor device, an exposure mask is manufactured on the basis of this data, and the semiconductor device is manufactured by using various steps, such as exposure, using an exposure mask.

For the apparatus for manufacturing a semiconductor device according to the present embodiment, the units are formed by program processes performed by the computer PC1. The main components of the apparatus for manufacturing a semiconductor device are a calculation unit 11, an analysis unit 12, and a correction unit 13.

The calculation unit 11 reads the physical layout data of a circuit to be manufactured from the server SV, and performs a calculation to modify a pattern width in physical layout data by a predetermined amount. Here, the amount of modification of the pattern width is stored in a database that indicates the relation with one of a parameter of the processing flow of a semiconductor manufacturing apparatus, and parameters of the film type, the film thickness, the polishing condition, the amount of film formation, and the amount of polishing of the planarizing film. The calculation unit 11 refers to this database, and causes the pattern width to be modified by an amount corresponding to the referenced amount of modification.

The analysis unit 12 reads the physical layout after the pattern width output from the calculation unit 11 is modified, performs quantitative calculations by using, with regard to the range of interest of the physical layout, at least one of the density of patterns, the pattern width, and the peripheral length of the range of interest and the range in the vicinity of the range of interest. On the basis of these calculations, a portion (hereinafter referred to as a "critical step-difference portion") that is predicted to remain as a step difference of a predetermined amount or more when a planarization process is performed on a planarizing film on a pattern is analyzed.

The correction unit 13 reads the data of the pattern at the critical step-difference portion, which is output from the analysis unit 12, performs a process for correction to a layout or manufacturing conditions under which a step difference of a predetermined amount or more does not remain. The layout and the manufacturing conditions after correction are stored in the database via a network, and are used in a computer attached to the manufacturing facilities of the semiconductor device.

Application to Program for Generating Mask Data

The program for generating mask data according to the present embodiment is a program executed by the computer PC1 that is the above-described apparatus for manufacturing a semiconductor device. The program for generating mask data is incorporated in a program executed by the computer PC1, for example, a place-and-route tool.

The program for generating mask data according to the present embodiment mainly has the following steps.
(1) Step in which a calculation for modifying the pattern width in the physical layout data of a circuit to be manufactured by a predetermined amount is performed.
(2) Step in which a critical step-difference portion that is predicted when a planarization process is performed on a planarizing film on a pattern is analyzed by quantitative calculations using, with regard to the range of interest of the physical layout after the pattern width is modified, at least one of the density of patterns, the pattern width, and the peripheral length of the range of interest and a range in the vicinity of the range of interest.
(3) Step in which, on the basis of the data of the pattern at the critical step-difference portion, correction is made to a layout in which a step difference of a predetermined amount or more does not remain, and mask data is generated on the basis of the corrected layout.

Specific application examples using these steps will be described later.

The program for generating mask data is used as part of a program for manufacturing a semiconductor device. That is, the program for manufacturing a semiconductor device according to the present embodiment is such that a mask is manufactured from mask data generated by applying a program for generating mask data according to the present embodiment, and the computer performs control for manufacturing a semiconductor device by using this mask.

Application to Method for Manufacturing Semiconductor Device

The method for manufacturing a semiconductor device according to the present embodiment is a method in which, by using the computer PC1 that is the above-described apparatus for manufacturing a semiconductor device, mask data is generated by the program for generating mask data, and a semiconductor device is manufactured by using this mask data. That is, the method is a method for manufacturing a semiconductor device by applying the apparatus for manufacturing a semiconductor device and the program for generating mask data.

More specifically, the method has the following steps.

(A) Step in which the physical layout data of a circuit to be manufactured is read into the calculation unit of the apparatus for manufacturing a semiconductor device, and the pattern width in the physical layout data is modified by a predetermined amount.

(B) Step in which the physical layout after the pattern width output from the calculation unit is modified is read into the analysis unit of the apparatus for manufacturing a semiconductor device, a quantitative calculation is performed by using, with regard to the range of interest of the physical layout, at least one of the density of patterns, the pattern width, and the peripheral length of the range of interest and a range in the vicinity of the range of interest, and the position at which a critical step-difference pattern is formed when a planarization process is performed on a planarizing film on a pattern is analyzed.

(C) Step in which the data of the critical step-difference pattern, which is output from the analysis unit, is read into the correction unit of the apparatus for manufacturing a semiconductor device, and correction is made to a layout or manufacturing conditions in which a step difference of a predetermined amount or more does not remain.

Here, the amount of the modification of the pattern width, which is performed by the calculation unit, is stored in a database that indicates the relation with one of a parameter of the processing flow of a semiconductor manufacturing apparatus, parameters of the film type, the film thickness, the polishing condition, the amount of film formation, and the amount of polishing of the planarizing film. The calculation unit refers to this database, and causes the pattern width to be modified by an amount corresponding to the referenced amount of modification.

As a result, the pattern at the critical step-difference portion is extracted from the physical layout data in a short time, mask data is generated by performing layout correction or by correcting the manufacturing conditions, and a semiconductor device is manufactured by using this mask data.

2. Specific Embodiments

Next, specific examples of the present embodiment will be described. Here, a description is given mainly of application examples in a portion in which mask data is generated. The examples are applied to a case in which a photo-mask is produced by using the mask data generated here, and a semiconductor device is manufactured by using this photo-mask.

First Embodiment

Figure 2:
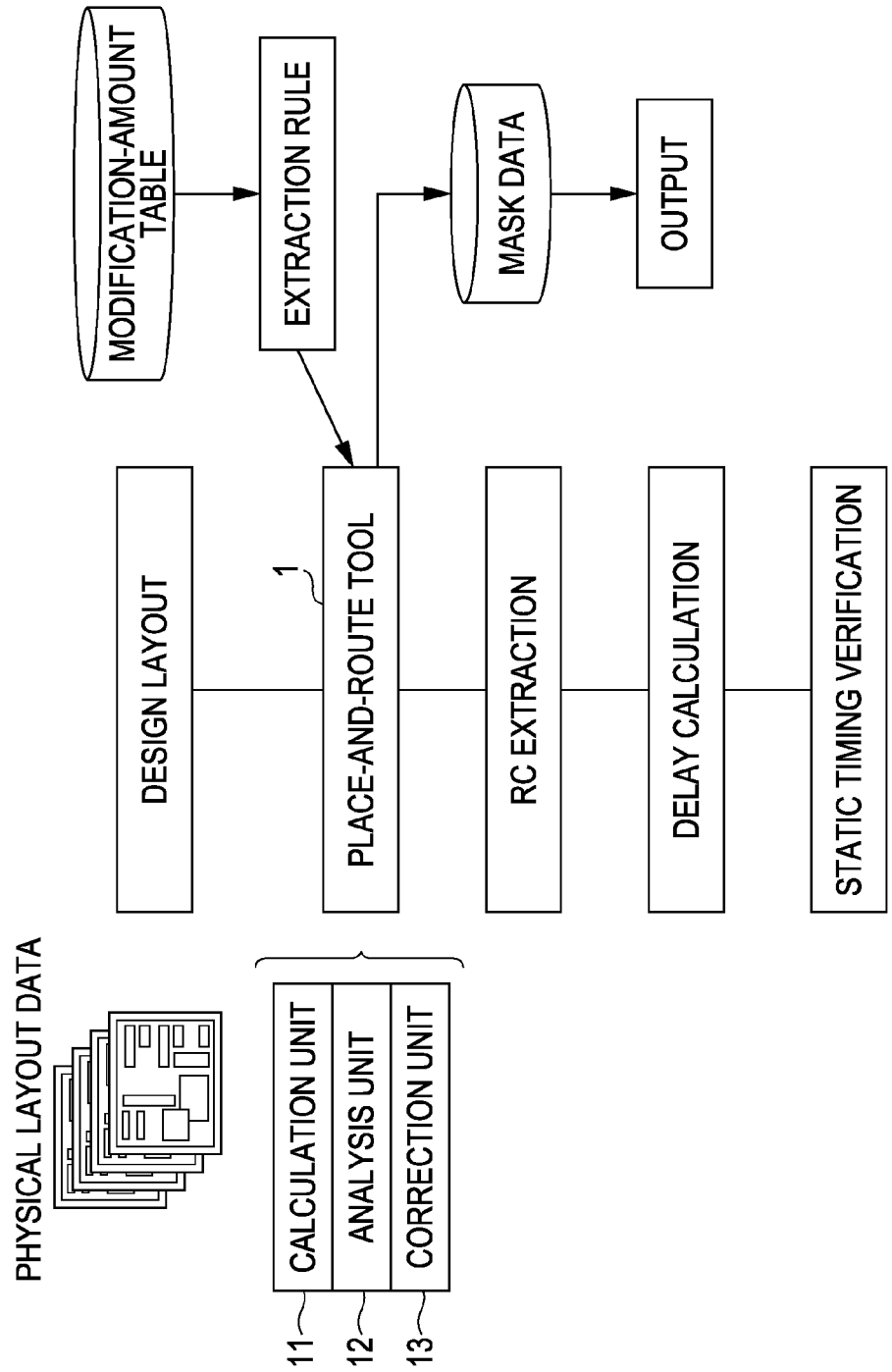
FIG. 2 is a flowchart illustrating a mask data generation process according to a first embodiment of the present invention.

FIG. 2 is a flowchart illustrating a mask data generation process according to a first embodiment of the present invention.

First, the design layout data (physical layout data) of a circuit to be manufactured is input to a place-and-route tool 1. Additionally, a modification amount table in which the preset amounts of modifications of pattern widths, and extraction rules regarding the coverage ratio of the pattern are input to the place-and-route tool 1. Here, the coverage ratio refers to the percentage of the area in plan view of a pattern in the area in plan view of the physical layout.

Next, the calculation unit 11 in the place-and-route tool 1 performs a process for resizing (modifying) the pattern width from the input design layout data in accordance with a modification amount table. The modification amount table is a table in which the amounts of modifications are set in accordance with the type of film formed on a pattern. The calculation unit 11 resizes the pattern width by an amount corresponding to the amount of the modification obtained by referring to this modification amount table.

Next, the analysis unit 12 of the place-and-route tool 1 performs the verification of the coverage ratio and the like on the basis of the extraction rule.

This verification is performed in such a manner that the range of interest is set with regard to the layout of the pattern after resizing, and quantitative calculations are performed by using at least one of the density of patterns (coverage ratio), the pattern width, and the peripheral length of the range of interest and a range in the vicinity of the range of interest. On the basis of the result of the calculation, a critical step-difference portion is obtained. Then, the result of the calculation is sent to the correction unit 13 of the place-and-route tool 1, whereby correction for the pattern at the critical step-difference portion, for example, correction for the arrangement of a dummy pattern and the layout (wiring extension, etc.), is performed. Furthermore, the critical step-difference portion and the value of the step difference are fed back to the manufacturing process.

When the extraction of all the critical step-difference portions based on the layout is completed, RC extraction (parasitic resistance, parasitic capacitance extraction), delay calculation, and static timing verification are performed. Furthermore, a process for generating mask data is performed on the basis of the corrected layout, and the mask data is output.

Here, a case is described as an example in which the calculation unit, the analysis unit, and the correction unit are incorporated in the place-and-route tool. However, whether or not the calculation unit, the analysis unit, and the correction unit are incorporated is not limited, and these units may be held in the outside. In this case, access should be made from the place-and-route tool to the calculation unit, the analysis unit, and the correction unit, and processing should be performed.

As described above, a mask is produced using the mask data generated after undergoing timing convergence by static timing verification and layout correction. Then, after lithography steps of exposure and development by using this mask, a processing process is performed, and a subsequent wafer process is performed.

In the wafer process, a planarizing film is formed on the formed pattern, and a planarization process is performed by the CMP method. During the CMP step, the optimization of processing conditions suitable for the degree of an error of the coverage ratio is performed with respect to a pattern at the critical step-difference portion extracted in advance. For the optimization of the processing conditions, for example, polishing time adjustment such as decreasing an over polishing time, polishing pressure adjustment such as decreasing a polishing pressure, number-of-rotations adjustment such as increasing the number of rotations of a surface plate, slurry adjustment such as increasing a slurry additive agent or changing a prescription ratio, changing the type of slurry, flow rate adjustment of slurry, and the like are performed.

Alternatively, for example, there are cases in which the change of the hardness of a polishing pad, the change of the hardness of a low-layer pad, the change of polishing pad grooves, or the change of conditioning conditions is effective. Alternatively, for example, it is possible to conduct a review of the flow of the semiconductor manufacturing, such as combining an increase in a polished film thickness and an increase in the amount of polishing, in addition to the CMP processing conditions.

The CMP conditions and the semiconductor manufacturing flow are set by considering the balance with other than planarization performance, such as manufacturing cost and throughput (process processing time period). At this time, by optimizing the CMP processing conditions so as to be set to the conditions in which importance is placed on the planarization performance, deterioration of the planarization degree in the critical step-difference pattern can be prevented. In the manner described above, measures for the CMP steps are added, and a semiconductor device is manufactured.

FIG. 3 shows an example of the correspondence among polishing processes, step-difference occurrence factors, and algorithms to be used to extract a critical step-difference pattern. Here, STI-CMP of the polishing process is a CMP process for an oxide film on shallow trench isolation (STI). PMD-CMP is a CMP process for an insulating film (for example, non doped silicate glass (NSG) on gate wiring and pre-metal dielectric (PMD)) using HDP (high density plasma). W-CMP is a CMP process for a bulk W in W wiring, and a barrier metal and an insulating film for the purpose of forming damascene W (tungsten) wiring. Cu-CMP is a CMP process for a bulk Cu in Cu wiring, and a barrier metal and an insulating film for the purpose of forming damascene Cu (copper) wiring.

As shown in the example of FIG. 3, in the present embodiment, an algorithm for extracting a critical step-difference pattern is changed according to the polishing process, so that a critical step-difference pattern appropriate for the polishing process is extracted. In each column of the algorithms (1) to (6), features of the layout used for each of the algorithms are shown. Here, "high", "low", "thick", "narrow", "large", and other quantitative representations, which represent features of the layout, and which are used in the description of the present embodiment, are relative to one another, and threshold values of "high", "low", and the like are changed in accordance with the material quality, the polishing conditions, and the like of a material to be polished.

FIGS. 4A and 4B show the concept of the occurrence of a step difference in CS-CMP. FIG. 4A shows a step-difference error that occurs in a pattern with a high coverage ratio. FIG. 4B shows a step-difference error that occurs in a pattern with a low coverage ratio. In both examples, the dashed lines in the figures indicate the state of the planarizing film before polishing by CMP, and the bold solid lines in the figures indicate the state of the planarizing film after polishing by CMP.

As shown in FIG. 4A, in pattern portions with a high coverage ratio, a step difference occurs between a pattern having a large line width and the other patterns after a film is formed. This step difference is considered to affect the step difference after polishing. In this example, a step difference occurs in a portion in which the line width is large and in a portion in which even if the line width is small, the density is high (step difference similar to the case in which the line width is large in conformal film formation).

As shown in FIG. 4B, in patterns with a low coverage ratio, the density of the patterns is small, and the spacing between adjacent patterns is wide. Consequently, even if conformal film formation is performed, a step difference occurs.

In the first embodiment, a description will be given of an example of an algorithm for extracting a critical step-difference pattern having a high coverage ratio and a large area, which is an algorithm (1) shown in FIG. 3. The algorithm for the extraction will be described below with reference to FIG. 5.

First, resizing of +30% to +100% of the amount of film formation is performed on a layout pattern.

In the present embodiment, the amount of film formation on the pattern is 500 nm, and the amount of resizing is set to 300 nm. After that, the coverage ratio of the layout in the pattern after resizing is calculated. At this time, the layout is divided into mesh elements of 50 μm, and a calculation is performed for each mesh element. Then, a portion in which the coverage ratio exceeds 80% is extracted. It is determined here that a portion in which the coverage ratio does not exceed 80% does not correspond to a critical step-difference portion.

Next, with regard to the extracted mesh (coverage ratio exceeds 80%), a calculation is made of the average coverage ratio of an area (7×7=49 mesh elements) formed by three mesh elements to the right, left, up, and down with the extracted mesh being the center. If this average coverage ratio is 75% or lower, it is determined that the area does not correspond to a critical step-difference portion.

Additionally, if the average coverage ratio is 75% or higher, the area is a critical step-difference portion. Here, this area is determined to be a critical step-difference portion of level A. Furthermore, a calculation is made of the average coverage ratio of an area (21×21=441 mesh elements) formed by ten mesh elements to the right, left, up, and down from a target mesh (target mesh with a coverage ratio of 80% or higher) at a critical step-difference portion of level A.

In a case where this average coverage ratio exceeds 75%, the area is determined to be a portion in which the degree of criticalness (degree of easiness with which a critical step-difference pattern is generated) is higher than the level A, and the area is set as a critical step-difference portion of level B. On the other hand, when the average coverage ratio is 75% or lower, the area is a critical step-difference portion of level A. After the level of the critical step-difference portion is set, correction corresponding to the level is performed.

Figure 5:
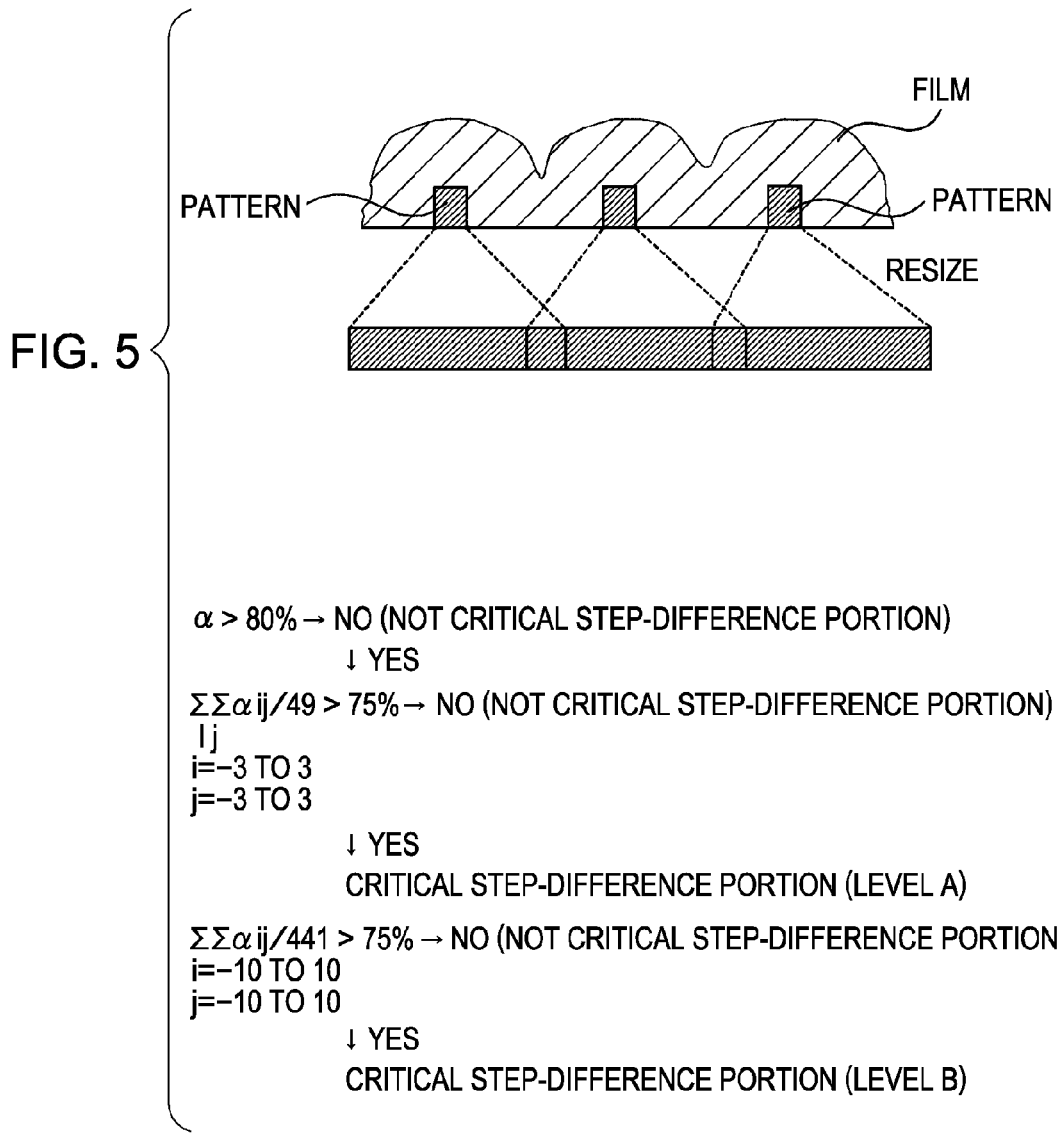
FIG. 5 illustrates an algorithm for extracting a critical step-difference pattern in the first embodiment.

FIG. 5 shows an arithmetic expression for extraction of a critical step-difference portion and level determination in accordance with algorithm (1). Here, α denotes a coverage ratio, i denotes the position of a mesh element in the horizontal direction in which the target mesh is set at 0, and j denotes the position of a mesh element in the vertical direction in which the target mesh is set at 0.

As a result of performing extraction of a critical step-difference portion in accordance with such an extraction rule, in a case where a critical step-difference portion is detected, a critical step-difference pattern is corrected by arranging a dummy pattern and changing the layout.

For example, in the arrangement of the dummy pattern, the size, the pitch, and the shape of the pattern are adjusted so that the step difference is overcome with respect to the extracted critical step-difference portion. For example, in a case where, from the start, a square dummy pattern of a 20 μm square is arranged at a pitch of 40 μm, in the case that the area is extracted as a critical step-difference portion in such a manner as for the average coverage ratio to exceed 75%, a square dummy pattern of a 20 μm square is arranged at a pitch of 80 μm in the extracted area. As a result, the average coverage ratio is 75% or lower, and the area does not correspond to a critical step-difference portion. Additionally, in the correction of the layout, for example, in the case of a metal layer, by performing re-detailed routing so as to decrease the degree of wiring congestion, it is possible to solve the degree of congestion of critical step-difference portions and possible to set the area to be outside the critical step-difference portion.

In a case where correction using a dummy pattern is performed, checking of the coverage ratio is performed once more using mesh elements of 1 mm in the vicinity of the mesh in which a dummy pattern is arranged as the center. Consequently, it is confirmed that no critical step-difference portions of levels A and B have been detected. For a portion in which it is difficult to perform correction by arranging a dummy pattern and changing the layout, the correction is performed by optimizing processing conditions.

For the optimization of the processing conditions, for example, polishing time adjustment such as decreasing an over polishing time, polishing pressure adjustment such as decreasing a polishing pressure, number-of-rotations adjustment such as increasing the number of rotations of a surface plate, slurry adjustment such as increasing a slurry additive agent or changing a prescription ratio, changing the type of slurry, slurry flow-rate adjustment, and the like are performed.

As described above, by extracting a critical step-difference pattern before mask data is generated and by performing correction, data in which a step-difference error is suppressed is output when generating mask data. As a result, it is possible to manufacture a semiconductor device in which a step-difference error is suppressed. The amount of resizing, the mesh size, and the area in which a coverage ratio is to be calculated, which are used in the above-described description, are not limited to these, and should be set variously in accordance with processing conditions, the calculation time, and the extraction accuracy.

Furthermore, in the algorithm of FIG. 5 used in the present embodiment, two levels A and B of degree of criticalness are prepared. A first advantage of preparing two levels is that different measures can be taken in accordance with the degree of criticalness. For example, for all the portions of rank B with a high degree of criticalness, layout correction and changing of the processing conditions such as those described above are performed. For the portions of rank A with a low degree of criticalness, a correction method and a way of correction can be changed in accordance with a determination made by a technician. That is, an error is confirmed, and it is determined that neither layout correction nor process handling are necessary, handling is performed by only changing processing conditions, only the layout correction is performed, and both the correction of the layout and the changing of the processing conditions can be performed. Furthermore, a judgment can be made, such that the number of error portions of rank A is counted in advance so that correction is not performed for a case in which the number of errors is, for example, ten or less.

A second advantage of preparing two levels of degree of criticalness is that the number of calculations can be reduced. In the case where there is only an error of rank B with a high degree of criticalness, since the extraction area is wide, it is necessary to perform calculation for the 21×21 mesh elements with all the mesh elements in which the coverage ratio exceeds 80% serving as the center. Additionally, as a result of the setting of two levels A and B, calculations of the 21×21 mesh elements are only made for portions corresponding to level A among the mesh elements in which the coverage ratio exceeds 80%, thereby making it possible to decrease the calculation area.

Second Embodiment

Figure 6:
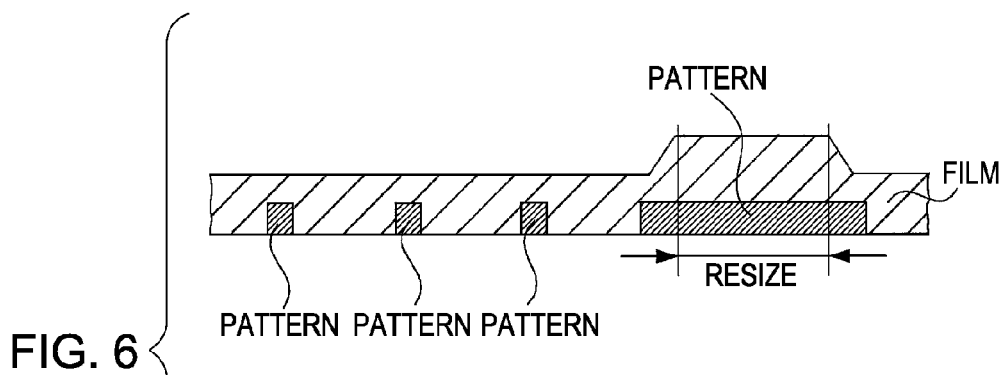
FIG. 6 illustrates an algorithm for extracting a critical step-difference pattern in a second embodiment of the present invention.

A second embodiment is directed to an example in which a type of film whose shape of a formed film described in the first embodiment differs is used, an extraction algorithm is changed to extract a critical step-difference portion, and a semiconductor device is manufactured. Therefore, the basic flow of the manufacture is the same as that of the first embodiment, and the extraction algorithm differs. FIG. 6 illustrates an algorithm for extracting a critical step-difference pattern in the second embodiment. This algorithm is an algorithm for extracting a critical step-difference pattern with regard to a pattern having a high coverage ratio and a large area, which is an algorithm (1) shown in FIG. 3.

First, resizing of −30% to −50% of the amount of film formation is performed on a layout pattern. After that, the coverage ratio of the layout in the pattern after resizing is calculated. At this time, the layout is divided into mesh elements of 50 μm, and a calculation is made for each mesh element. Then, a portion in which the coverage ratio exceeds 80% is extracted. Here, it is determined that a portion in which the coverage ratio does not exceed 80% does not correspond to a critical step-difference portion.

Next, with regard to the extracted mesh (coverage ratio exceeds 80%), a calculation is made of the average coverage ratio of an area (7×7=49 mesh elements) formed by three mesh elements to the right, left, up, and down with the extracted mesh being the center. If this average coverage ratio is 75% or lower, it is determined that the area does not correspond to a critical step-difference portion.

Additionally, if the average coverage ratio is 75% or higher, the area is a critical step-difference portion. Here, this portion is determined to be a critical step-difference portion of level A. Furthermore, a calculation is made of the average coverage ratio of an area (21×21=441 mesh elements) formed by ten mesh elements to the right, left, up, and down of a target mesh (target mesh with a coverage ratio of 80% or higher) at a critical step-difference portion of level A.

In a case where this average coverage ratio exceeds 75%, the area is determined to be a portion in which the degree of criticalness (degree of easiness with which a critical step-difference pattern is generated) is higher than the level A, and the area is set as a critical step-difference portion of level B. On the other hand, when the average coverage ratio is 75% or lower, the area is a critical step-difference portion of level A. After the level of the critical step-difference portion is set, correction corresponding to the level is performed.

FIG. 6 shows an arithmetic expression for extraction of a critical step-difference portion and level determination in accordance with algorithm (1). Here, α denotes a coverage ratio, i denotes the position of a mesh element in the horizontal direction in which the target mesh is set as 0, and j denotes the position of a mesh element in the vertical direction in which the target mesh is set as 0.

As a result of performing extraction of a critical step-difference portion in accordance with such an extraction rule, in a case where a critical step-difference portion is detected, a critical step-difference pattern is corrected by arranging a dummy pattern and changing the layout.

For example, in the arrangement of a dummy pattern, the size, the pitch, and the shape of the pattern are adjusted so that the step difference is overcome with respect to the extracted critical step-difference portion. For example, in a case where, from the start, a square dummy pattern of a 2 μm square is arranged at a pitch of 4 μm, in the case that the portion is extracted as a critical step-difference portion in such a manner as for the average coverage ratio to exceed 75%, a square dummy pattern of a 2 μm square is arranged at a pitch of 8 μm in the extracted area. As a result, the average coverage ratio becomes 75% or lower, and the portion does not correspond to a critical step-difference portion. Additionally, in the correction of the layout, for example, in the case of a metal layer, by performing re-detailed routing so as to decrease the degree of wiring congestion, it is possible to solve the degree of congestion of critical step-difference portions and possible to set the portion to be outside the critical step-difference portion.

In a case where correction using a dummy pattern is performed, checking of the coverage ratio is performed once more using mesh elements of 1 mm in the vicinity of the mesh in which a dummy pattern is arranged serving as the center. consequently it is confirmed that no critical step-difference portions of levels A and B have been detected. For a portion in which it is difficult to perform correction by arranging a dummy pattern and changing the layout, the correction is performed by optimizing processing conditions.

For the optimization of the processing conditions, for example, polishing time adjustment such as decreasing an over polishing time, polishing pressure adjustment such as decreasing a polishing pressure, number-of-rotations adjustment such as increasing the number of rotations of a surface plate, slurry adjustment such as increasing a slurry additive agent or changing a prescription ratio, changing the type of slurry, flow rate adjustment of slurry, and the like are performed.

As described above, by extracting a critical step-difference pattern before mask data is generated and by performing correction, data in which a step-difference error is suppressed is output when generating mask data. As a result, it is possible to manufacture a semiconductor device in which a step-difference error is suppressed. The amount of resizing, the mesh size, and the area in which a coverage ratio is to be calculated, which are used in the above-described description, are not limited to these, and should be set variously in accordance with processing conditions, the calculation time, and the extraction accuracy.

Furthermore, in the algorithm of FIG. 5 used in the present embodiment, two levels A and B of degree of criticalness are prepared. A first advantage of preparing two levels is that different measures can be taken in accordance with the degree of criticalness. For example, for all the portions of rank B with a high degree of criticalness, layout correction and changing of the processing conditions such as those described above are performed. For the portions of rank A with a low degree of criticalness, a correction method and a way of correction can be changed in accordance with a determination made by a technician. That is, an error is confirmed, and it is determined that neither layout correction nor process handling are necessary, handling is performed by only changing processing conditions, only layout correction is performed, and both correction of the layout and changing of the processing conditions can be performed. Furthermore, a judgment can be made, such that the number of error portions of rank A is counted in advance so that correction is not performed for a case in which the number of errors is, for example, ten or less.

A second advantage of preparing two levels of degree of criticalness is that the number of calculations can be reduced. In the case where there is only an error of rank B with a high degree of criticalness, since the extraction area is wide, it is necessary to perform a calculation for the 21×21 mesh elements with all the mesh elements in which the coverage ratio exceeds 80% serving as the center. Additionally, as a result of the setting of two levels A and B, calculations of the 21×21 mesh elements is only made for portions corresponding to level A among the mesh elements in which the coverage ratio exceeds 80%, thereby making it possible to decrease the calculation area.

Third Embodiment

Figure 7:
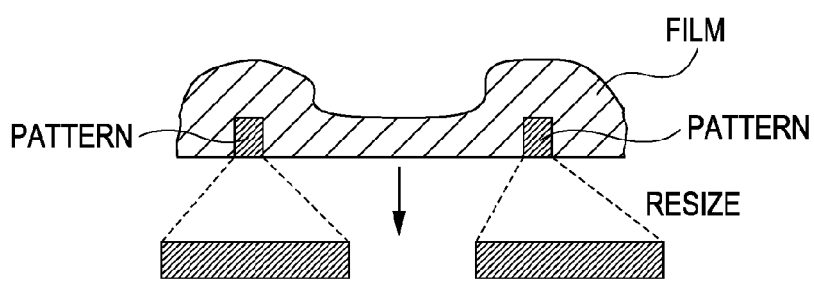
FIG. 7 illustrates an algorithm for extracting a critical step-difference pattern in a third embodiment of the present invention.

A third embodiment is directed to an example in which a type of film whose shape of a formed film described in the first embodiment differs is used, an extraction algorithm is changed to extract a critical step-difference portion, and a semiconductor device is manufactured. Therefore, the basic flow of the manufacture is the same as that of the first embodiment, and the extraction algorithm differs. FIG. 7 illustrates an algorithm for extracting a critical step-difference pattern in the third embodiment. This algorithm is an algorithm for extracting a critical step-difference pattern with regard to a pattern having a low coverage ratio and a large area, which is an algorithm (2) shown in FIG. 3.

First, resizing of +30% to +100% of the amount of film formation is performed on a layout pattern. After that, the coverage ratio of the layout in the pattern after resizing is calculated. At this time, the layout is divided into mesh elements of 50 μm, and a calculation is made for each mesh element. Then, a portion in which the coverage ratio is smaller than 20% is extracted. Here, it is determined that the portion in which the coverage ratio is 20% or more does not correspond to a critical step-difference portion.

Next, with regard to the mesh (coverage ratio is less than 20%), a calculation is made of the average coverage ratio of an area (7×7=49 mesh elements) formed by three mesh elements to the right, left, up, and down. If this average coverage ratio is 30% or more, it is determined that the portion does not correspond to a critical step-difference portion.

Additionally, if the average coverage ratio is less than 30%, the portion is a critical step-difference portion. Here, this portion is determined to be a critical step-difference portion of level A. Furthermore, a calculation is made of the average coverage ratio of an area (21×21=441 mesh elements) formed by ten mesh elements to the right, left, up, and down of a target mesh (target mesh with a coverage ratio of less than 20%) at a critical step-difference portion of level A.

In a case where this average coverage ratio is less than 35%, the area is determined to be a portion in which the degree of criticalness (degree of easiness with which a critical step-difference pattern is generated) is higher than the level A, and the area is set as a critical step-difference portion of level B. On the other hand, when the average coverage ratio is 35% or higher, the area is a critical step-difference portion of level A. After the level of the critical step-difference portion is set, correction corresponding to the level is performed.

FIG. 7 shows an arithmetic expression for extraction of a critical step-difference portion and level determination in accordance with algorithm (2). Here, α denotes a coverage ratio, i denotes the position of a mesh element in the horizontal direction in which the target mesh is set as 0, and j denotes the position of a mesh element in the vertical direction in which the target mesh is set as 0.

As a result of performing extraction of a critical step-difference portion in accordance with such an extraction rule, in a case where a critical step-difference portion is detected, a critical step-difference pattern is corrected by arranging a dummy pattern and changing the layout.

For example, in the arrangement of a dummy pattern, the size, the pitch, and the shape of the pattern are adjusted so that the step difference is overcome with respect to the extracted critical step-difference portion. For example, in a case where, from the start, a square dummy of a 2 μm square is arranged at a pitch of 8 μm, the average coverage ratio becomes 30% or lower, and in a case where the portion is extracted as a critical step-difference portion, a square dummy pattern of a 2 μm square is additionally arranged at a pitch of 2 μm in the extracted area. As a result, the average coverage ratio is 30% or higher, and the portion does not correspond to a critical step-difference portion.

In a case where correction using a dummy pattern is performed, checking of the coverage ratio is performed once more using mesh elements of 1 mm in the vicinity of the mesh, in which a dummy pattern is arranged, serving as the center. Thus, it is confirmed that no critical step-difference portions of levels A and B have been detected. For a portion in which it is difficult to perform correction by arranging a dummy pattern and changing the layout, the correction is performed by optimizing processing conditions.

For the optimization of the processing conditions, for example, polishing time adjustment such as decreasing an over polishing time, polishing pressure adjustment such as decreasing a polishing pressure, number-of-rotations adjustment such as increasing the number of rotations of a surface plate, slurry adjustment such as increasing a slurry additive agent, changing a prescription ratio, changing the type of slurry, flow rate adjustment of slurry, and the like are performed.

As described above, by extracting a critical step-difference pattern before mask data is generated and by performing correction, data in which a step-difference error is suppressed is output when generating mask data. As a result, it is possible to manufacture a semiconductor device in which a step-difference error is suppressed. The amount of resizing, the mesh size, and the area in which a coverage ratio is to be calculated, which are used in the above-described description, are not limited to these, and should be set variously in accordance with processing conditions, the calculation time, and the extraction accuracy.

Furthermore, in the algorithm of FIG. 7 used in the present embodiment, two levels A and B of degree of criticalness are prepared. A first advantage of preparing two levels is that different measures can be taken in accordance with the degree of criticalness. For example, for all the portions of rank B with a high degree of criticalness, layout correction and changing of the processing conditions such as those described above are performed. For the portions of rank A with a low degree of criticalness, a correction method and a way of correction can be changed in accordance with a determination made by a technician. That is, an error is confirmed, and it is determined that neither layout correction nor process handling are necessary, handling is performed by only changing processing conditions, only layout correction is performed, and both correction of the layout and changing of the processing conditions can be performed. Furthermore, a judgment can be made, such that the number of error portions of rank A is counted in advance so that correction is not performed for a case in which the number of errors is, for example, ten or less.

A second advantage of preparing two levels of degree of criticalness is that the number of calculations can be reduced. In the case where there is only an error of rank B with a high degree of criticalness, since the extraction area is wide, it is necessary to perform a calculation for the 21×21 mesh elements with all the mesh elements in which the coverage ratio exceeds 80% serving as the center. Additionally, as a result of the setting of two levels A and B, calculations of the 21×21 mesh elements are only made for portions corresponding to level A among the mesh elements in which the coverage ratio exceeds 80%, thereby making it possible to decrease the calculation area.

Fourth Embodiment

Figure 8:
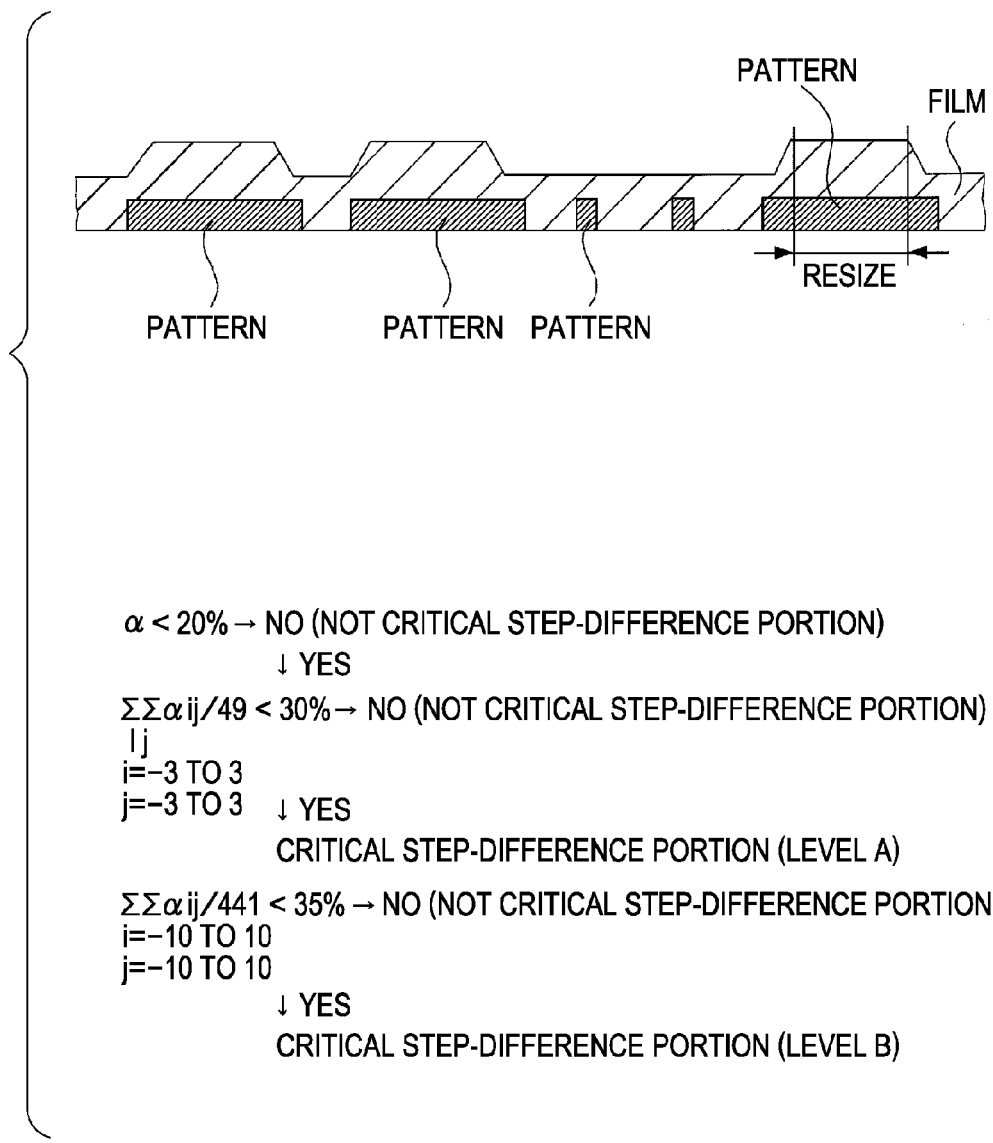
FIG. 8 illustrates an algorithm for extracting a critical step-difference pattern in a fourth embodiment of the present invention.

A fourth embodiment is directed to an example in which a type of film whose shape of a formed film described in the second embodiment differs is used, an extraction algorithm is changed to extract a critical step-difference portion, and a semiconductor device is manufactured. Therefore, the basic flow of the manufacture is the same as that of the first embodiment, and the extraction algorithm differs. FIG. 8 illustrates an algorithm for extracting a critical step-difference pattern in the fourth embodiment. This algorithm is an algorithm for extracting a critical step-difference pattern with regard to a pattern having a low coverage ratio and a large area, which is an algorithm (2) shown in FIG. 3.

First, resizing of −30% to −50% of the amount of film formation is performed on a layout pattern. After that, the coverage ratio of the layout in the pattern after resizing is calculated. At this time, the layout is divided into mesh elements of 50 μm, and a calculation is made for each mesh element. Then, a portion in which the coverage ratio is less than 20% is extracted. Here, it is determined that a portion in which the coverage ratio is 20% or higher does not correspond to a critical step-difference portion.

Next, with regard to the mesh (coverage ratio is less than 20%), a calculation is made of the average coverage ratio of an area (7×7=49 mesh elements) formed by three mesh elements to the right, left, up, and down with that mesh being the center. If this average coverage ratio is 30% or higher, it is determined that the portion does not correspond to a critical step-difference portion.

Additionally, if the average coverage ratio is less than 30%, the portion is a critical step-difference portion. Here, this portion is determined to be a critical step-difference portion of level A. Furthermore, a calculation is made of the average coverage ratio of an area (21×21=441 mesh elements) formed by ten mesh elements to the right, left, up, and down of a target mesh (target mesh with a coverage ratio of less than 20%) at a critical step-difference portion of level A.

In a case where this average coverage ratio is less than 35%, the area is determined to be a portion in which the degree of criticalness (degree of easiness with which a critical step-difference pattern is generated) is higher than the level A, and the area is set as a critical step-difference portion of level B. On the other hand, when the average coverage ratio is 35% or higher, the area is a critical step-difference portion of level A. After the level of the critical step-difference portion is set, correction corresponding to the level is performed.

FIG. 8 shows an arithmetic expression for extraction of a critical step-difference portion and level determination in accordance with algorithm (2). Here, α denotes a coverage ratio, i denotes the position of a mesh element in the horizontal direction in which the target mesh is set as 0, and j denotes the position of a mesh element in the vertical direction in which the target mesh is set as 0.

As a result of performing extraction of a critical step-difference portion in accordance with such an extraction rule, in a case where a critical step-difference portion is detected, a critical step-difference pattern is corrected by arranging a dummy pattern and changing the layout.

For example, in the arrangement of a dummy pattern, the size, the pitch, and the shape of the pattern are adjusted so that the step difference is overcome with respect to the extracted critical step-difference portion. For example, in a case where, from the start, a square dummy of a 2 μm square is arranged at a pitch of 8 μm, the average coverage ratio is 30% or lower, and in a case where the portion is extracted as a critical step-difference portion, a square dummy pattern of a 2 μm square is additionally arranged at a pitch of 2 μm in the extracted area. As a result, the average coverage ratio becomes 30% or higher, and the portion does not correspond to a critical step-difference portion.

In a case where correction using a dummy pattern is performed, checking of the coverage ratio is performed once more using mesh elements of 1 mm in the vicinity of the mesh in which a dummy pattern is arranged serving as the center. Thus, it is confirmed that no critical step-difference portions of levels A and B have been detected. For a portion in which it is difficult to perform correction by arranging a dummy pattern and changing the layout, the correction is performed by optimizing processing conditions.

For the optimization of the processing conditions, for example, polishing time adjustment such as decreasing an over polishing time, polishing pressure adjustment such as decreasing a polishing pressure, number-of-rotations adjustment such as increasing the number of rotations of a surface plate, slurry adjustment such as increasing a slurry additive agent or changing a prescription ratio, changing the type of slurry, flow rate adjustment of a slurry, and the like are performed.

As described above, by extracting a critical step-difference pattern before mask data is generated and by performing correction, data in which a step-difference error is suppressed is output when generating mask data. As a result, it is possible to manufacture a semiconductor device in which a step-difference error is suppressed. The amount of resizing, the mesh size, and the area in which a coverage ratio is to be calculated, which are used in the above-described description, are not limited to these, and should be set variously in accordance with processing conditions, the calculation time, and the extraction accuracy.

Furthermore, in the algorithm of FIG. 8 used in the present embodiment, two levels A and B of degree of criticalness are prepared. A first advantage of preparing two levels is that different measures can be taken in accordance with the degree of criticalness. For example, for all the portions of rank B with a high degree of criticalness, layout correction and changing of processing conditions such as those described above are performed. For the portions of rank A with a low degree of criticalness, a correction method and a way of correction can be changed in accordance with a determination made by a technician. That is, an error is confirmed, and it is determined that neither layout correction nor process handling are necessary, handling is performed by only changing processing conditions, only layout correction is performed, and both correction of the layout and changing of processing conditions can be performed. Furthermore, a judgment can be made, such that the number of error portions of rank A is counted in advance so that correction is not performed for a case in which the number of errors is, for example, ten or less.

A second advantage of preparing two levels of degree of criticalness is that the number of calculations can be reduced. In the case where there is only an error of rank B with a high degree of criticalness, since the extraction area is wide, it is necessary to perform a calculation for the 21×21 mesh elements with all the mesh elements in which the coverage ratio exceeds 80% serving as the center. Additionally, as a result of the setting of two levels A and B, calculations for the 21×21 mesh elements are only made for portions corresponding to level A among the mesh elements in which the coverage ratio exceeds 80%, thereby making it possible to decrease the calculation area.

Fifth Embodiment

A fifth embodiment is directed to an example in which a type of film whose shape of a formed film described in the first embodiment differs is used, an extraction algorithm is changed to extract a critical step-difference portion, and a semiconductor device is manufactured. Therefore, the basic flow of the manufacture is the same as that of the first embodiment, and the extraction algorithm differs.

Figure 9:
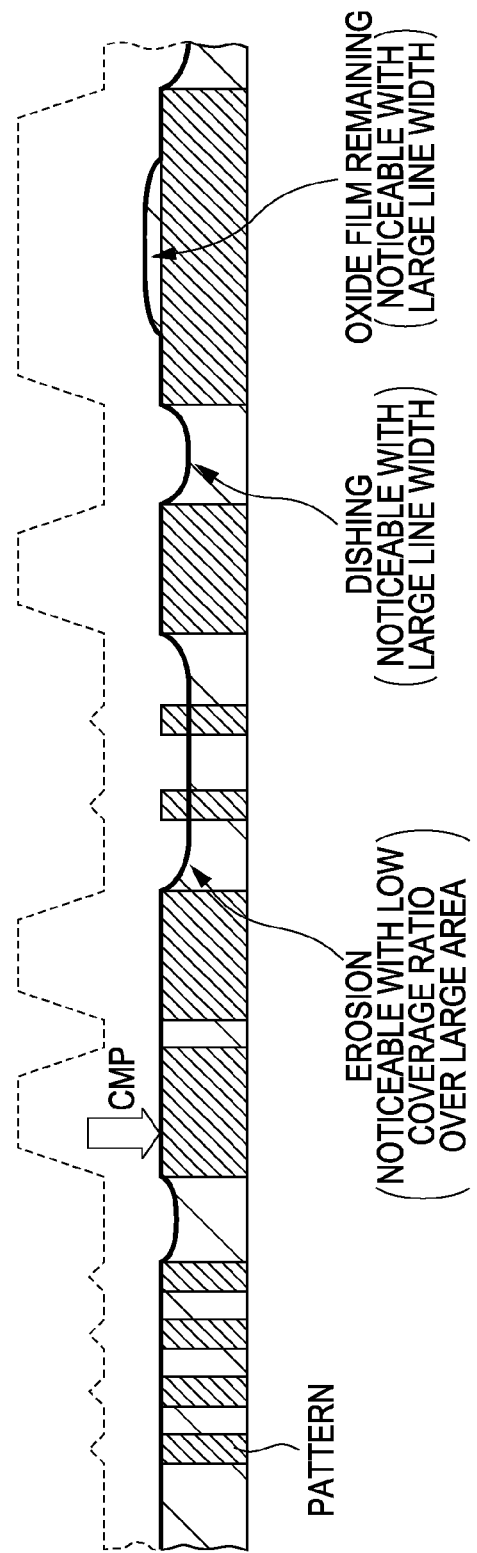
FIG. 9 is a schematic view illustrating the state of a step difference handled in the present embodiment.

FIG. 9 is a schematic view illustrating the state of a step difference handled in the present embodiment. The dashed line in the figure indicates the state of a planarizing film before polishing, and the bold solid line in the figure indicates the state of the planarizing film after polishing. That is, in a portion in which the density of layout patterns is low, since the amount of film formation before polishing is small, a state (dishing) in which the film is excessively polished during polishing has occurred. An algorithm for detecting this dishing will be described below.

Figure 10:
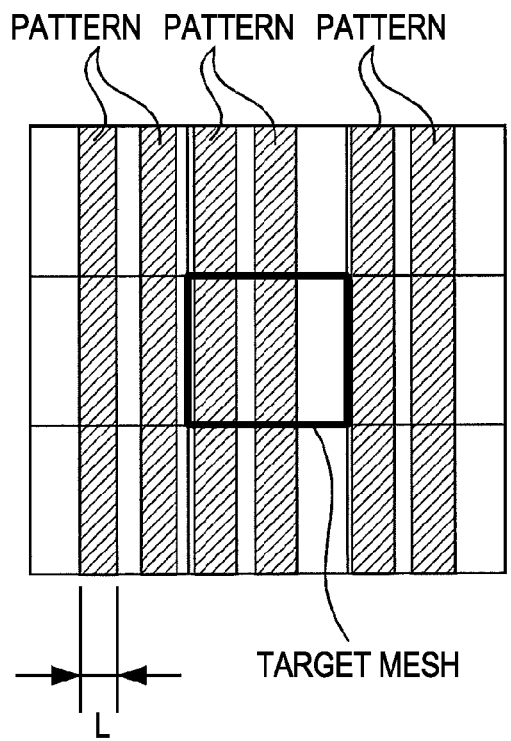
FIG. 10 illustrates an algorithm for extracting a critical step-difference pattern in a fifth embodiment of the present invention.

FIG. 10 illustrates an algorithm for extracting a critical step-difference pattern in the fifth embodiment. This algorithm is an algorithm for extracting a critical step-difference pattern with regard to a pattern having a wide width wiring and a large area, which is an algorithm (3) shown in FIG. 3.

First, it is detected whether or not there is a line width of a pattern of L or more in the mesh elements. If no mesh having a line width of L or more exists, it is determined that the target mesh does not correspond to a critical step-difference portion.

On the other hand, in a case where a line width of L or more exists, the number of the consecutive mesh elements is checked. In a case where three or more mesh elements are consecutive in the vertical and horizontal directions, these are set as critical step-difference portions. In the case where there are two or less mesh elements, these are not critical step-difference portions. In the present embodiment, it is set that, for example, L=300 μm.

FIG. 10 shows an arithmetic expression for extraction of a critical step-difference portion and level determination in accordance with algorithm (3). Here, L denotes the line width of a pattern, i denotes the position of a mesh element in the horizontal direction in which the target mesh is set as 0, and j denotes the position of a mesh element in the vertical direction in which the target mesh is set as 0.

Figure 11A:
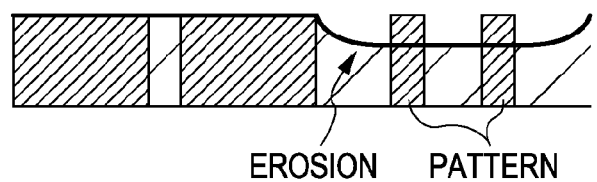
FIGS. 11A and 11B illustrate an algorithm for extracting a portion in which a difference in the coverage ratio with an adjacent mesh with a low coverage ratio is large.
Figure 11B:
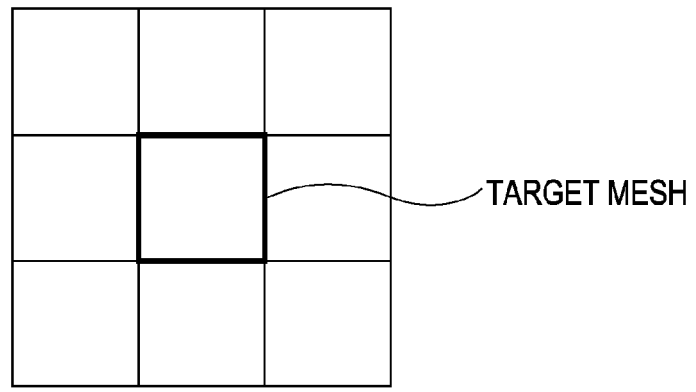

FIGS. 11A and 11B illustrate an algorithm for extracting a portion in which the coverage ratio difference with an adjacent mesh with a low coverage ratio is large. This algorithm is an algorithm for extracting a critical step-difference portion due to erosion shown in FIG. 11A, and corresponds to an algorithm (4) shown in FIG. 3.

First, as shown in FIG. 11B, the coverage ratio of the target mesh is checked. If the coverage ratio is 5% or less, the difference in the coverage ratio with the eight adjacent mesh elements surrounding the target mesh is checked. When the difference is 10% or more, the target mesh is a critical step-difference portion.

FIG. 11B shows an arithmetic expression for extraction of a critical step-difference portion and level determination in accordance with algorithm (4). Here, $\rho A$ denotes the coverage ratio of a target mesh, i denotes the position of a mesh element in the horizontal direction in which the target mesh is set as 0, and j denotes the position of a mesh element in the vertical direction in which the target mesh is set as 0. Furthermore, $\rho Aij$ denotes the coverage ratio of the mesh element at the position (i, j) in which the target mesh is at the center.

As a result of performing extraction of a critical step-difference portion in accordance with such an extraction rule, in a case where a critical step-difference portion is detected, a critical step-difference pattern is corrected by arranging a dummy pattern and changing the layout.

For example, in the arrangement of a dummy pattern, the size, the pitch, and the shape of the pattern are adjusted so that the step difference is overcome with respect to the extracted critical step-difference portion. For example, in a case where, from the start, a square dummy of a 2 μm square is arranged at a 10 μm pitch, the average coverage ratio is 5% or lower, and in a case where the portion is extracted as a critical step-difference portion, a square dummy pattern of a 1 μm square is additionally arranged at a pitch of 2 μm in the extracted area. As a result, the average coverage ratio is 5% or more, and the portion does not correspond to a critical step-difference portion.

As described above, by extracting a critical step-difference pattern before mask data is generated and by performing correction, data in which a step-difference error is suppressed is output when generating mask data. As a result, it is possible to manufacture a semiconductor device in which a step-difference error is suppressed. The amount of resizing, the mesh size, and the area in which a coverage ratio is to be calculated, which are used in the above-described description, are not limited to these, and should be set variously in accordance with processing conditions, the calculation time, and the extraction accuracy.

Sixth Embodiment

A sixth embodiment is directed to an example in which a type of film whose shape of a formed film described in the first embodiment differs is used, an extraction algorithm is changed to extract a critical step-difference portion, and a semiconductor device is manufactured. Therefore, the basic flow of the manufacture is the same as that of the first embodiment, and the extraction algorithm differs.

Figure 12:
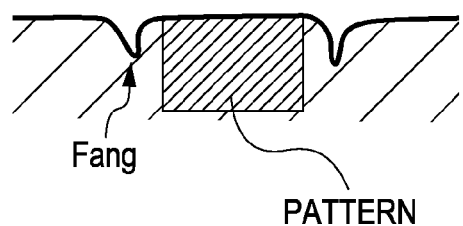
FIG. 12 is a schematic view showing a state (Fang) in which a planarizing film after polishing is recessed at the boundary of a layout.
Figure 13:
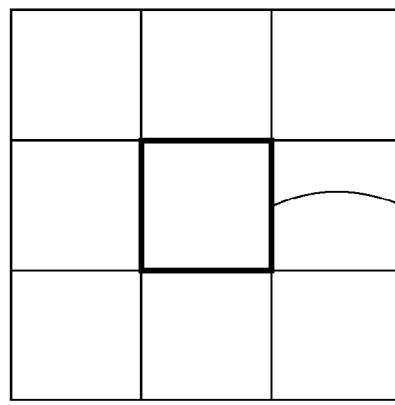
FIG. 13 illustrates an algorithm for extracting Fang.

FIG. 12 is a schematic view showing a state (fang) in which a planarizing film after polishing has recessed in the boundary of the layout. This phenomenon occurs in a case where the target mesh has a low coverage ratio, and the difference in the coverage ratio between the target mesh and the adjacent mesh elements is large. FIG. 13 illustrates an algorithm for extracting this state. This algorithm corresponds to an algorithm (5) shown in FIG. 3.

That is, first, the coverage ratio of the target mesh is checked. If the coverage ratio is 20% or less, the difference of the coverage ratio with the adjacent eight mesh elements surrounding the target mesh is checked. When the difference is 20% or more, the target mesh is a critical step-difference portion.

FIG. 13 shows an arithmetic expression for extraction of a critical step-difference portion and level determination in accordance with algorithm (5). Here, $\rho A$ denotes the coverage ratio of a target mesh, i denotes the position of a mesh element in the horizontal direction in which the target mesh is set as 0, and j denotes the position of a mesh element in the vertical direction in which the target mesh is set as 0. Furthermore, $\rho Aij$ denotes the coverage ratio of the mesh at the position (i, j), in which the target mesh is at the center.

As a result of performing extraction of a critical step-difference portion in accordance with such an extraction rule, in a case where a critical step-difference portion is detected, a critical step-difference pattern is corrected by arranging a dummy pattern and changing the layout.

For example, in the arrangement of a dummy pattern, the size, the pitch, and the shape of the pattern are adjusted so that the step difference is overcome with respect to the extracted critical step-difference portion. For example, in a case where, from the start, a square dummy of a 2 μm square is arranged at a pitch of 8 μm, the average coverage ratio is 5% or lower in the algorithm of FIG. 13, and in a case where the portion is extracted as a critical step-difference portion, a square dummy pattern of a 1.5 μm square is additionally arranged at a pitch of 2 μm in the extracted area. As a result, the average coverage ratio is greater than 20%, and the portion does not correspond to a critical step-difference portion.

As described above, by extracting a critical step-difference pattern before mask data is generated and by performing correction, data in which a step-difference error is suppressed is output when generating mask data. As a result, it is possible to manufacture a semiconductor device in which a step-difference error is suppressed. The amount of resizing, the mesh size, and the area in which a coverage ratio is to be calculated, which are used in the above-described description, are not limited to these, and should be set variously in accordance with processing conditions, the calculation time, and the extraction accuracy.

Seventh Embodiment

A seventh embodiment is directed to an example in which a type of film whose shape of a formed film described in the first embodiment differs is used, an extraction algorithm is changed to extract a critical step-difference portion, and a semiconductor device is manufactured. Therefore, the basic flow of the manufacture is the same as that of the first embodiment, and the extraction algorithm differs.

Figure 14:
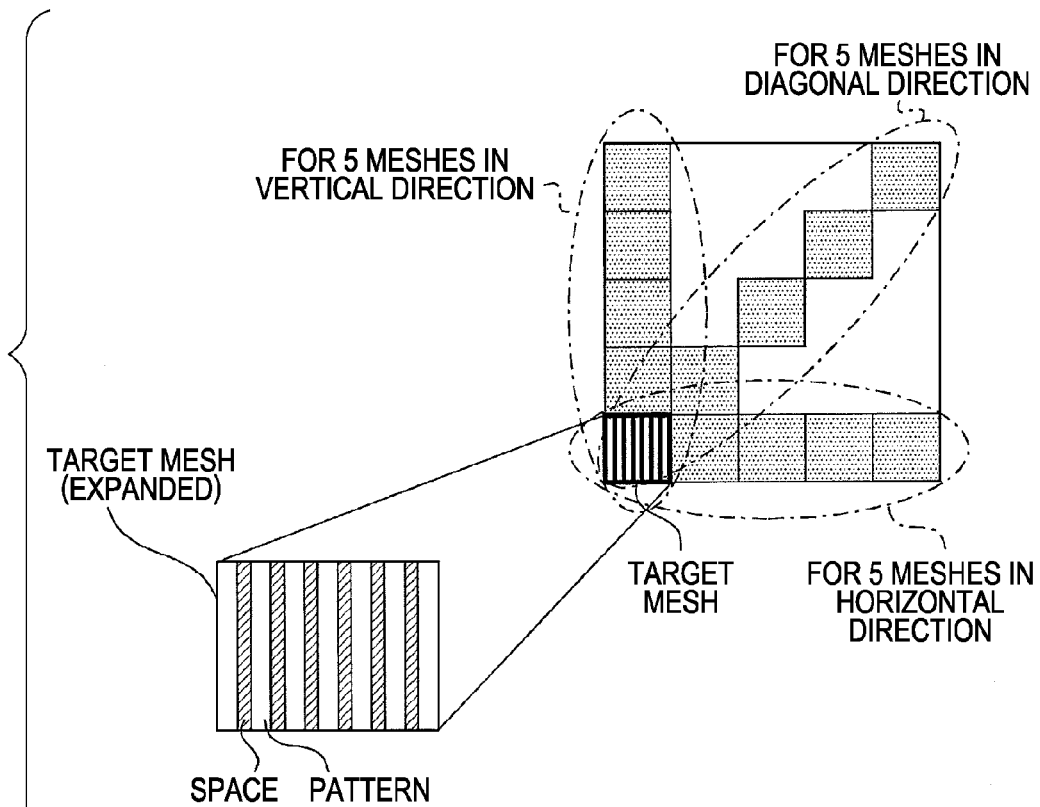
FIG. 14 is a first diagram illustrating an algorithm for extracting Hump.

The algorithm according to the present embodiment is an algorithm for extracting a layout in which the coverage ratio of a target mesh is of an approximately medium degree, the mesh is formed using a patterns having a narrow line width, the mesh of the conditions exists in a large area, and the area in the vicinity of the mesh has a low coverage ratio. In this case, a step difference called Hump is easily generated. FIG. 14 illustrates an algorithm for detecting Hump. This algorithm corresponds to an algorithm (6) shown in FIG. 3.

First, it is verified whether the coverage ratio of the target mesh is 40% to 60%. In the case that it is 40% to 60%, a calculation is made of the average coverage ratio of the peripheral area (see the mesh elements indicated by dots in the figure) for five mesh elements in the vertical, horizontal, and diagonal directions, including the target mesh. Then, in the case that this average coverage ratio is 10% or less, the peripheral length of the target mesh is checked. Here, the peripheral length refers to the extension length of the sides of the pattern.

In a case where the peripheral length is 2 mm or more and there is a line width smaller than or equal to three times the minimum line width of the design rule, the portion is a critical step-difference portion. If even only one of the conditions is not satisfied, the portion is not a critical step-difference portion.

FIG. 14 shows an arithmetic expression for extraction of a critical step-difference portion and level determination in accordance with algorithm (6). Here, $\rho A$ denotes the coverage ratio of a target mesh, i denotes the position of a mesh element in the horizontal direction in which the target mesh is set as 0, and j denotes the position of a mesh element in the vertical direction in which the target mesh is set as 0. Furthermore, $\rho Aij$ denotes the coverage ratio of a mesh at a position (i, j), in which the target mesh is at the center. Furthermore, Peri denotes the peripheral length of a pattern, L denotes the line width of the pattern, Lmin denotes the minimum line width of the design rule.

As a result of performing extraction of a critical step-difference portion in accordance with such an extraction rule, in a case where a critical step-difference portion is detected, a critical step-difference pattern is corrected by arranging a dummy pattern and changing the layout.

For example, in the arrangement of a dummy pattern, the size, the pitch, and the shape of the pattern are adjusted so that the step difference is overcome with respect to the extracted critical step-difference portion. For example, in a case where, from the start, a square dummy of a 2 μm square is arranged at a pitch of 8 μm pitch, the average coverage ratio is 5% or lower in the algorithm of FIG. 14. In a case where the portion is extracted as a critical step-difference portion, a square dummy pattern of a 1 μm square is additionally arranged at a pitch of 2 μm in the extracted area. As a result, the average coverage ratio is greater than 10%, and the portion does not correspond to a critical step-difference portion.

As described above, by extracting a critical step-difference pattern before mask data is generated and by performing correction, data in which a step-difference error is suppressed is output when generating mask data. As a result, it is possible to manufacture a semiconductor device in which a step-difference error is suppressed. The amount of resizing, the mesh size, and the area in which a coverage ratio is to be calculated, which are used in the above-described description, are not limited to these, and should be set variously in accordance with processing conditions, the calculation time, and the extraction accuracy.

Eighth Embodiment

An eighth embodiment is directed to an example in which a type of film whose shape of a formed film described in the second embodiment differs is used, an extraction algorithm is changed to extract a critical step-difference portion, and a semiconductor device is manufactured. Therefore, the basic flow of the manufacture is the same as that of the first embodiment, and the extraction algorithm differs.

The algorithm according to the present embodiment is an algorithm for extracting a layout in which areas having a narrow line width are consecutive and a mesh having a low coverage ratio exists in the vicinity thereof. In this case, a step difference called Hump is easily generated. FIG. 15 illustrates an algorithm for detecting Hump. This algorithm corresponds to an algorithm (6) shown in FIG. 3.

First, in a case where a line width smaller than three times the minimum line width of the design rule exists in the target mesh, and the peripheral length of the mesh is a fixed value or more (2 mm in the present embodiment), the number of consecutive mesh elements is checked. As shown in FIG. 15, in a case where the number of consecutive areas is three or more in the horizontal direction, the coverage ratio of the mesh in the vicinity thereof is further checked.

In a case where the coverage ratio of the vicinity is 20% or less, and two or more mesh elements continue as shown in FIG. 13, the portion is a critical step-difference portion. If even only one of the conditions is not satisfied, the portion is not a critical step-difference portion.

FIG. 15 shows an arithmetic expression for extraction of a critical step-difference portion and level determination in accordance with algorithm (6). Here, i denotes the position of a mesh element in the horizontal direction in which the target mesh is set as 0, and j denotes the position of a mesh element in the vertical direction in which the target mesh is set as 0. Furthermore, αa denotes the coverage ratio of peripheral mesh elements. Furthermore, L denotes the line width of a pattern, and Lmin denotes the minimum line width of the design rule.

As a result of performing extraction of a critical step-difference portion in accordance with such an extraction rule, in a case where a critical step-difference portion is detected, a critical step-difference pattern is corrected by arranging a dummy pattern and changing the layout.

For example, in the arrangement of a dummy pattern, the size, the pitch, and the shape of the pattern are adjusted so that the step difference is overcome with respect to the extracted critical step-difference portion. For example, in a case where, from the start, a square dummy of a 2 μm square is arranged at a pitch of 8 μm, the average coverage ratio is 5% or lower in the algorithm of FIG. 15, and in a case where the portion is extracted as a critical step-difference portion, a square dummy pattern of a 1.5 μm square is additionally arranged at a pitch of 2 μm in the extracted area. As a result, the average coverage ratio is greater than 20%, and the portion does not correspond to a critical step-difference portion.

As described above, by extracting a critical step-difference pattern before mask data is generated and by performing correction, data in which a step-difference error is suppressed is output when generating mask data. As a result, it is possible to manufacture a semiconductor device in which a step-difference error is suppressed. The amount of resizing, the mesh size, and the area in which a coverage ratio is to be calculated, which are used in the above-described description, are not limited to these, and should be set variously in accordance with processing conditions, the calculation time, and the extraction accuracy.

Ninth Embodiment

Figure 16:
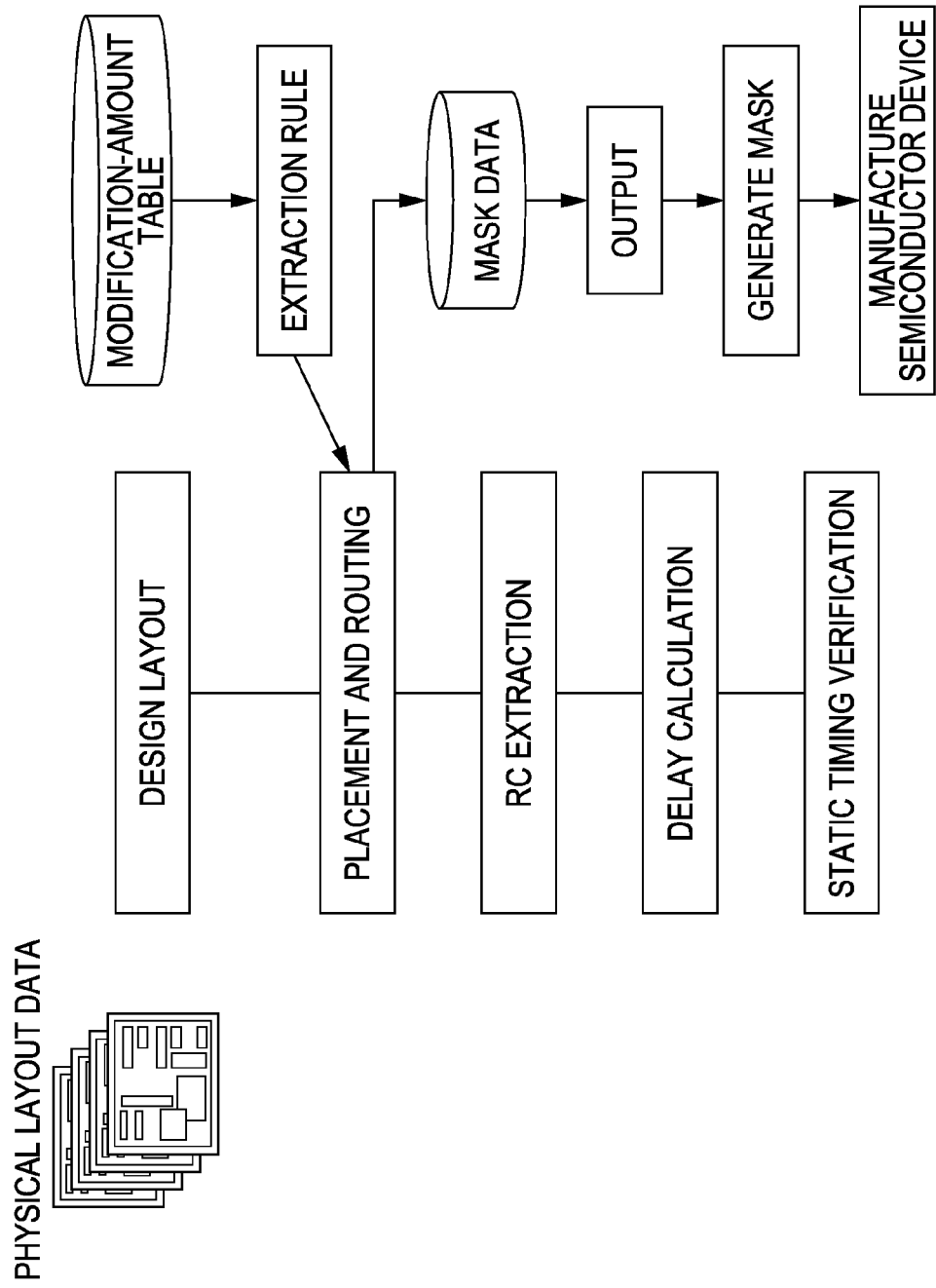
FIG. 16 is a flowchart of a method for manufacturing a semiconductor device.
Figure 18:
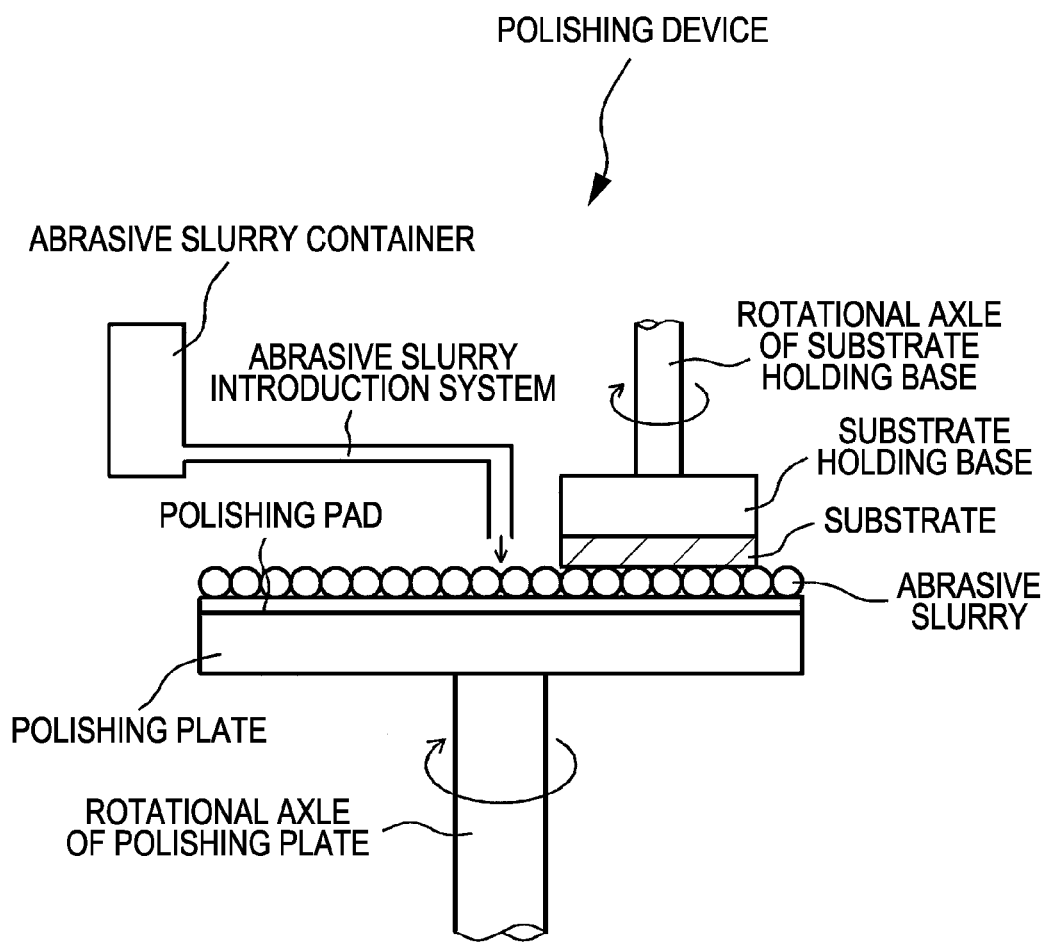
FIG. 18 is a conceptual view of a polishing device for use in a CMP method.

A ninth embodiment is directed to an example in which when a semiconductor device is to be manufactured in accordance with a flow shown in FIG. 16, rules of extracting a critical step-difference pattern are determined on the basis of experimental data. In the present embodiment, a layout for determining an extraction rule for the algorithm (4) of FIG. 3 is created, and conditions in which a recess of a film near a pattern edge, shown in FIG. 12, appears are checked.

The layout is prepared by changing the area density of a target mesh and the difference between the area density of the target mesh and the average area density of mesh elements in the vicinity of the target mesh in units of 50 μm. The results in which a planarization process is performed on a tungsten layer by the CMP method by using this mask are shown in FIG. 17.

Figure 17:
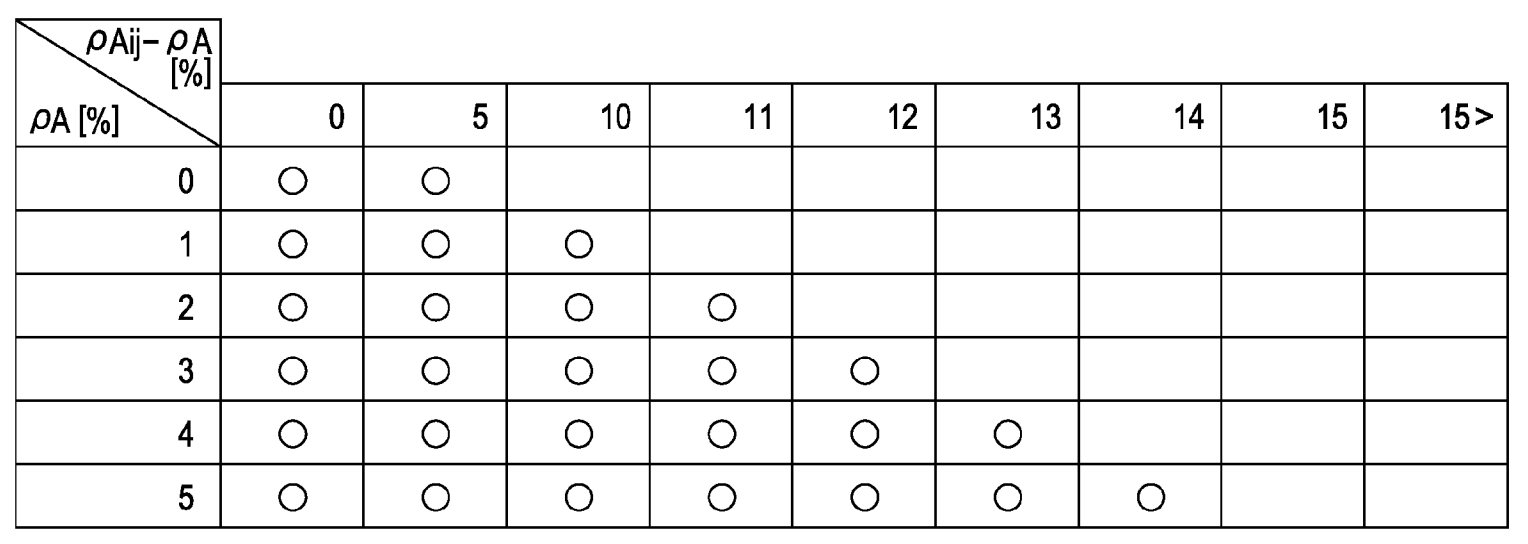

In FIG. 17, the columns indicate the coverage ratio (ρA) of a target mesh of a layout, and the rows indicate the difference (ρAij−ρA) in the coverage ratio with the mesh elements adjacent with the target mesh. The results of the experiment show that areas with ○ marks in the figure are problem-free areas.

Therefore, the extraction rule is determined as $\rho A \leq 5\%$ and $\rho Aij - \rho A \geq 10\%$ (i=−1 to 1, j=−1 to 1). By using this extraction rule, the layout of the product is checked, and a critical step-difference portion is detected. Next, the processing conditions are optimized for the detected critical step-difference portions so as to eliminate step differences.

For the optimization of the processing conditions, for example, polishing time adjustment such as decreasing an over polishing time, polishing pressure adjustment such as decreasing a polishing pressure, number-of-rotations adjustment such as increasing the number of rotations of a surface plate, slurry adjustment such as increasing a slurry additive agent or changing a prescription ratio, changing a type of slurry, flow rate adjustment of slurry, and the like are performed. As a result, the yield of devices can be improved.

In the present embodiment, a critical portion is extracted in the flow of FIG. 16 by using the algorithm (4) of FIG. 3 as an extraction algorithm. The algorithm is not limited to the algorithm (4), and all the algorithms shown in FIG. 3 can be used in accordance with a step difference to be suppressed, making it possible to produce an intended device.

As a result of manufacturing a semiconductor device in accordance with the above-described embodiments, a problematical step difference does not occur on a planarizing film with which a pattern of a circuit is covered.

3. Form of Program

In order that the above-described various programs are executed by a CPU of a computer, the programs are stored in a storage unit of the computer, recorded on a recording medium, such as a CD-ROM, or distributed via a network.

The present application contains subject matter related to that disclosed in Japanese Priority Patent Application JP 2009-121604 filed in the Japan Patent Office on May 20, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method for manufacturing a semiconductor device, comprising the steps of:
reading physical layout data of a circuit to be manufactured into a calculation unit and performing a calculation to modify a pattern width in the physical layout data by a predetermined amount;
reading into an analysis unit a physical layout after the pattern width is modified, the physical layout being output from the calculation unit, and analyzing a surface topology above a pattern that is predicted to remain with a topological step difference of at least a predetermined amount should a planarization process be performed on a planarizing film on the pattern by a quantitative calculation using, with regard to a range of interest of the physical layout, at least one of a density of patterns, a pattern width, and a peripheral length of the range of interest and a range in the vicinity of the range of interest; and
reading data of the pattern that is predicted to remain into a correction unit, and making a correction to determine a layout of the pattern in which the topological step difference of at least the predetermined amount does not remain,
wherein, in analyzing the surface topology
(a) a mesh area is selected based on having a planarizing film area to pattern area ratio outside of a first predetermined limit, and
(b) the selected mesh area is identified as having the topological step difference of at least the predetermined amount when an average planarizing film area to pattern area ratio for the selected mesh area and one or more adjacent mesh areas is determined to be outside of a second predetermined limit.

2. The method for manufacturing a semiconductor device according to claim 1, wherein:
the analysis unit sets a plurality of different levels of predicted topological step differences with regard to the surface topology above the pattern that is predicted to remain, and
the correction unit performs correction of the layout of the pattern read into the analysis unit after the pattern width is modified, the correction being made in accordance with the plurality of levels set by the analysis unit.

3. The method for manufacturing a semiconductor device according to claim 1, wherein, when the correction unit corrects the layout of the pattern that is predicted to remain, the correction unit performs at least one of correction of the width of the pattern, correction of the extension of the pattern, and correction of arranging a dummy pattern in the vicinity of the pattern.

4. The method for manufacturing a semiconductor device according to claim 1, wherein the analysis unit switches between various procedures of analyzing the layout of the pattern that is predicted to remain on the basis of conditions of a planarization process for a planarizing film on the pattern.

5. The method for manufacturing a semiconductor device according to claim 1, wherein (1) the calculation unit refers to a database that indicates the relationship between an amount of modification and one of (a) a parameter of a processing flow of a semiconductor manufacturing apparatus, and (b) parameters of a film type, a film thickness, polishing conditions, an amount of film formation, and an amount of polishing of the planarizing film, and (2) modifies the pattern width by an amount corresponding to the referenced amount of modification.

6. A method for manufacturing a semiconductor device, comprising the steps of:
reading into an analysis unit a physical layout data of a circuit to be manufactured into a calculation unit and performing a calculation to modify a pattern width in the physical layout data by a predetermined amount;
reading into an analysis unit a physical layout after the pattern width is modified, the physical layout being output from the calculation unit, and analyzing a surface topology above a pattern that is predicted to remain with a topological step difference of a at least a predetermined amount should a planarization be performed on a planarizing film on the pattern by a quantitative calculation using, with regard to a range of interest of the physical layout, at least one of a density of patterns, a pattern width, and a peripheral length of the range of interest and a range in the vicinity of the range of interest; and
reading data of the pattern that is predicted to remain into a correction unit, and making a correction to manufacturing conditions to determine a pattern in which the topological step difference is reduced,
wherein, in analyzing the surface topology
(a) a mesh area is selected based on having a planarizing film area to pattern area ratio outside of a first predetermined limit, and
(b) the selected mesh area is identified as having the topological step difference of at least the predetermined amount when an average planarizing film area to pattern area ratio for the selected mesh area and one or more adjacent mesh areas is determined to be outside of a second predetermined limit.

7. The method for manufacturing a semiconductor device according to claim 6, wherein:
the analysis unit sets a plurality of different levels of predicted topological step differences with regard to the surface topology above the pattern that is predicted to remain, and
the correction unit performs correction of manufacturing conditions in accordance with the plurality of levels that are set by the analysis unit.

8. An apparatus for manufacturing a semiconductor device, comprising:
a calculation unit configured to read physical layout data of a circuit to be manufactured and perform a calculation to modify a pattern width in the physical layout data by a predetermined amount;
an analysis unit configured to read a physical layout after the pattern width is modified, the physical layout being output from the calculation unit, and analyze a surface topology above a pattern that is predicted to remain with a topological step difference of at least a predetermined amount should a planarization process be performed on a planarizing film on the pattern by a quantitative calculation using, with regard to a range of interest of the physical layout, at least one of a density of patterns, a pattern width, and a peripheral length of the range of interest and a range in the vicinity of the range of interest; and a correction unit configured to read data of the pattern that is predicted to remain and generate a new layout for the pattern in which the topological step difference of at least the predetermined amount does not remain, wherein, in analyzing the surface topology (a) a mesh area is selected based on having a planarizing film area to pattern area ratio outside of a first predetermined limit, and (b) the selected mesh area is identified as having the topological step difference of at least the predetermined amount when an average planarizing film area to pattern area ratio for the selected mesh area and one or more adjacent mesh areas is determined to be outside of a second predetermined limit.

9. An apparatus for manufacturing a semiconductor device, comprising:

a calculation unit configured to read physical layout data of a circuit to be manufactured and perform a calculation to modify a pattern width in the physical layout data by a predetermined amount;

an analysis unit configured to read a physical layout after the pattern width is modified, the physical layout being output from the calculation unit, and analyze a surface topology above the pattern that is predicted to remain with a topological step difference of at least a predetermined amount should a planarization process be performed on a planarizing film on the pattern by a quantitative calculation using, with regard to a range of interest of the physical layout, at least one of a density of patterns, a pattern width, and a peripheral length of the range of interest and a range in the vicinity of the range of interest; and a correction unit configured to read data of the pattern that is predicted to remain and affect a change to manufacturing conditions in which the topological step difference is reduced, wherein, in analyzing the surface topology (a) a mesh area is selected based on having a planarizing film area to pattern area ratio outside of a first predetermined limit, and (b) the selected mesh area is identified as having the topological step difference of at least the predetermined amount when an average planarizing film area to pattern area ratio for the selected mesh area and one or more adjacent mesh areas is determined to be outside of a second predetermined limit.

10. A tangible non-transitory storage medium having stored thereon a program for manufacturing a semiconductor device, the program causing a computer to perform processing comprising the steps of:

performing a calculation to modify a pattern width in physical layout data of a circuit to be manufactured by a predetermined amount;

analyzing a surface topology above a pattern that is predicted to remain with a topological step difference of at least a predetermined amount should a planarization process be performed on a planarizing film on the pattern by a quantitative calculation using, with regard to a range of interest of the physical layout after the pattern width is modified, at least one of a density of patterns, a pattern width, and a peripheral length of the range of interest and a range in the vicinity of the range of interest; and making a correction to determine a layout of the pattern in which the topological step difference of at least the predetermined amount does not remain on the basis of data of the pattern that is predicted to remain as the step difference, wherein, in analyzing the surface topology (a) a mesh area is selected based on having a planarizing film area to pattern area ratio outside of a first predetermined limit, and (b) the selected mesh area is identified as having the topological step difference of at least the predetermined amount when an average planarizing film area to pattern area ratio for the selected mesh area and one or more adjacent mesh areas is determined to be outside of a second predetermined limit.

11. A tangible non-transitory storage medium having stored thereon a program for manufacturing a semiconductor device, the program causing a computer to perform processing comprising the steps of:

performing a calculation to modify a pattern width in physical layout data of a circuit to be manufactured by a predetermined amount;

analyzing surface topology above a pattern that is predicted to remain with a topological step difference of at least a predetermined amount should a planarization process be performed on a planarizing film on the pattern by a quantitative calculation using, with regard to a range of interest of the physical layout after the pattern width is modified, at least one of a density of patterns, a pattern width, and a peripheral length of the range of interest and a range in the vicinity of the range of interest; and making a correction to manufacturing conditions in which a step difference is reduced on the basis of data of the pattern that is predicted to remain as the step difference, wherein, in analyzing the surface topology (a) a mesh area is selected based on having a planarizing film area to pattern area ratio outside of a first predetermined limit, and (b) the mesh area is identified as having the topological step difference of at least the predetermined amount when an average planarizing film area to pattern area ratio for the selected mesh area and one or more adjacent mesh areas is determined to be outside of a second predetermined limit.

12. A tangible non-transitory storage medium having stored thereon a program for generating mask data, the program causing a computer to perform processing comprising the steps of:

performing a calculation to modify a pattern width in physical layout data of a circuit to be manufactured by a predetermined amount;

analyzing a surface topology above a pattern that is predicted to remain with a topological step difference of at least a predetermined amount should a planarization process be performed on a planarizing film on the pattern by a quantitative calculation y using, with regard to a range of interest of the physical layout after the pattern width is modified, at least one of a density of patterns, a pattern width, and a peripheral length of the range of interest and a range in the vicinity of the range of interest; and making a corrected layout of the pattern in which the topological step difference of at least the predetermined amount does not remain on the basis of data of the pattern that is predicted to remain, and generating mask data on the basis of the corrected layout,
wherein, in analyzing the surface topology
  (a) a mesh area is selected based on having a planarizing film area to pattern area ratio outside of a first predetermined amount, and
  (b) the selected mesh area is identified as having the topological step difference of at least the predetermined amount when an average planarizing film area to pattern area ratio for the selected mesh area and one or more adjacent mesh areas is determined to be outside of a second predetermined limit.

* * * * *